(12) United States Patent
Vantalon et al.

(10) Patent No.: US 8,151,110 B2
(45) Date of Patent: Apr. 3, 2012

(54) METHODS AND APPARATUSES FOR CONFIGURING PRODUCTS

(75) Inventors: Luc Vantalon, Sunnyvale, CA (US); Paolo Siccardo, Los Altos, CA (US)

(73) Assignee: Digital Keystone, Inc., Mountain View, CA (US)

( * ) Notice: Subject to any disclaimer, the term of this patent is extended or adjusted under 35 U.S.C. 154(b) by 1077 days.

(21) Appl. No.: 11/316,849

(22) Filed: Dec. 22, 2005

(65) Prior Publication Data
US 2006/0136702 A1    Jun. 22, 2006

Related U.S. Application Data

(63) Continuation-in-part of application No. 10/913,671, filed on Aug. 5, 2004.

(51) Int. Cl.
*G06F 21/00* (2006.01)
(52) U.S. Cl. .............. 713/168; 713/1; 713/181; 713/189
(58) Field of Classification Search .............. 713/1, 168, 713/169, 181, 189
See application file for complete search history.

(56) References Cited

U.S. PATENT DOCUMENTS

| | | | |
|---|---|---|---|
| 4,860,353 A | 8/1989 | Brown | |
| 5,029,207 A * | 7/1991 | Gammie | 380/228 |
| 5,703,950 A | 12/1997 | Jovanovich et al. | |
| 5,970,143 A * | 10/1999 | Schneier et al. | 713/181 |
| 6,064,989 A | 5/2000 | Cordery et al. | |
| 6,272,636 B1 * | 8/2001 | Neville et al. | 713/189 |
| 7,131,004 B1 | 10/2006 | Lyle | |
| 7,454,169 B2 * | 11/2008 | Soerensen et al. | 455/26.1 |
| 2002/0032903 A1 | 3/2002 | Sprunk | |
| 2003/0056107 A1 * | 3/2003 | Cammack et al. | 713/189 |
| 2003/0114144 A1 * | 6/2003 | Minemura | 455/410 |
| 2004/0052380 A1 | 3/2004 | Sprunk | |
| 2004/0133653 A1 * | 7/2004 | Defosse et al. | 709/217 |

(Continued)

FOREIGN PATENT DOCUMENTS
EP    0 881 600 A2    12/1998
(Continued)

OTHER PUBLICATIONS

International Search Report and Written Opinion of the International Searching Authority for PCT/US2005/027892, mailed Oct. 31, 2005.

(Continued)

*Primary Examiner* — Brandon Hoffman
*Assistant Examiner* — Helai Salehi
(74) *Attorney, Agent, or Firm* — Blakely, Sokoloff, Taylor & Zafman LLP

(57) ABSTRACT

Methods and apparatuses for configuring products for security. In one aspect, a method of manufacturing a device, includes: determining a first executable code for the device, the first executable code being one of a plurality of different executable codes that are capable of being executed on the device, the plurality of executable codes having a same overall functionality but different operations which generates different results from same input data; and loading the first executable code into the device. In one embodiment, a connection between a data processing system and the device is established while the device is being manufactured; and the connection is used to load the first executable code and a new set of identifier information in a format compatible with the first executable code into the device. For example, the connection includes a secure authenticated channel established using an initial set of identifier information stored in the device.

32 Claims, 26 Drawing Sheets

U.S. PATENT DOCUMENTS

2006/0031676 A1    2/2006    Vantalon et al.

FOREIGN PATENT DOCUMENTS

| | | | |
|---|---|---|---|
| EP | 1 081 891 | A2 | 3/2001 |
| WO | WO 2004/019615 | A1 | 3/2004 |

OTHER PUBLICATIONS

Society of Cable Telecommunications Engineers (SCTE). ANSI/SCTE 41, 2003.

Chapter I International Preliminary Report on Patentability for PCT/US2005/027892, mailed Feb. 15, 2007.

European Search Report for EP Application No. 06126945.2, dated Oct. 22, 2008 (7 pages).

Van Moffaert, A. et al. "Digital Rights Management," Technology White Paper, Alcatel Telecommunications Review, Alcatel, Paris, Apr. 1, 2003, pp. 1-7.

* cited by examiner

METHODS AND APPARATUSES FOR CONFIGURING PRODUCTS

The present application is a continuation-in-part application of a co-pending U.S. patent application Ser. No. 10/913,671, entitled "Methods and Apparatuses for Configuring Products", filed on Aug. 5, 2004 by inventors Luc Vantalon and Paolo Siccardo.

FIELD OF THE TECHNOLOGY

At least some embodiments of the invention relate to product serialization and/or configuration, more particularly, to configuring products for authentication, such as configuring digital television sets or components of such sets, to have unique identities suitable for use in a copy protection system and to have executable security codes to access the identities stored on the corresponding digital television sets.

BACKGROUND

Communication signals typically propagate from the source to the destination through one or more segments of transmission media. Some segments of the transmission media may not be physically secured against unauthorized access. To protect the content embedded in the transmitted signals against unauthorized access, many communication protocols, authentication and encryption/scrambling methods have been developed and used. Research and development in this field will further lead to better protocols and methods. It is understood that any of these protocols and methods can be used with the present invention.

A device is typically assigned a set of identifier information to facilitate authentication. The set of identifier information represents the device. The set of identifier information typically includes public and secret information, which can be used to prove the authenticity of its identity. When the secret information is revealed, other devices may be used to pretend to be this device. The authentication process ensures that the other party in the communication process is indeed the intended recipient.

Further, the set of identifier information may also include public and secret information for establishing a secured (encrypted/scrambled) communication channel for the protection of the transmitted content. The secret information for establishing a secured communication channel may be unique for each of the devices in the system, or be shared information. When such information is revealed, the security strength of the communication channel may degrade.

For example, a digital certificate based on public key cryptography can be used as a part of the identifier information. In public key cryptography, a pair of two complementary keys, a public key and a private key, is such that any information digitally signed using the private key can only be verified using the public key, and conversely, any information encrypted using the public key can only be decrypted using the private key. Typically, a trusted party called a certificate authority issues a digital certificate. The certificate confirms the authenticity of an identity with a digital signature of the certificate authority. The digital signature of the certificate is generated using the private key of the certificate authority. The certificate authority's public key can be used to verify the authenticity of the certificate. The information encrypted using the public key of the identity can only be decrypted using the private key of the identity. The private key associated with the identity is the secret information, which when compromised allows others in possession of the private key to decrypt the information intended for the identity. On the other hand, the private key of the identity can be used to sign information sent from the identity. The public key associated with the identity can be used to verify that the digitally signed information is from one in possession of the private key of the identity.

Diffie-Hellman is a public key agreement protocol based on the intractability of taking discrete logarithms over the integer field. The protocol uses two system parameters p and g, which are used by all the users of a system. Parameter p is a prime number; and parameter g is an integer less than p and is capable of generating a number from 1 to p−1 using a number n and the expression ($g^n$ mod p). To derive a shared secret key, two users first pick their own random private values a and b respectively. Then, the two users compute public values ($g^a$ mod p) and ($g^b$ mod p) respectively. After exchanging the public values, the two users compute a shared secret key ($g^{ab}$ mod p) using the exchanged public values. The two users can then use the shared secret key to encrypt and decrypt messages.

Dynamic Feedback Arrangement Scrambling Technique (DFAST) is a technique for scrambling binary data. American National Standards Institute/Society of Cable Telecommunications Engineers (ANSI/SCTE) 41 2003 requires the use of DFAST. Detailed aspects of DFAST may be found in U.S. Pat. No. 4,860,353.

Many communication protocols and data encryption/scrambling schemes have been developed based on known technologies, such as digital certificates and digital signatures, Diffie-Hellman and DFAST, to provide a desirable strength of security for communication over an insecure medium. For example, ANSI/SCTE 41 2003 standard makes use of the signature verification techniques, Diffie-Hellman and DFAST to provide a Point of Deployment (POD) copy protection system. According to the ANSI/SCTE 41 2003 standard, a Point of Deployment (POD) security module provides protections for valuable contents distributed through a digital cable system (e.g., the high value movies and video programs). When authorized, a POD module removes the scrambling that is added by the conditional access scrambling system. Before delivery of the content to a host (e.g., set-top terminals, or consumer receivers, such as a digital television set, or a personal video recorder (PVR)), the POD module may re-scramble the content, such as the movies and video programs. A POD copy protection system performs: 1) host authentication through the exchange of certificates and through the use of signature verification techniques; and 2) copy protection key derivation using a Diffie-Hellman shared secret key that is computed during the host verification process. The POD module uses the copy protection key to re-scramble the content before delivery with copy control information over a secure channel of communication to the receiver. Further details about the methods and schemes to protect contents over the insecure medium between the POD and the host can be found in ANSI/SCTE 41 2003, which is hereby incorporated here by reference.

A "Man in the Middle" attack may break the security provided by public key cryptography. In a "Man in the Middle" attack, an attacker intercepts the transmission of the public key of a victim and substitutes it with the public key of the attacker. Thus, a message intended for the victim becomes encrypted with the public key of the attacker. As the "Man in the Middle", the attacker decrypts the message using its own private key, re-encrypts it with the public key of the victim and relays the message to the victim. Thus, the attacker gains access to the message that is intended only for the victim. Communication protocols have been designed to resist "Man in the Middle" attacks. For example, ANSI/SCTE 41 2003 requires the verification of an authentication key to resist "Man in the Middle" attacks.

In general, a product may use a combination of a number of encryption/scrambling techniques and authentication techniques with a particular communication protocol to achieve a desired strength of protection against unauthorized access.

A successful product that embeds one or more security algorithms to enforce the delivery of premium content is often subject to software and hardware attack for the purpose of defeating those security protocols. In reaction to this threat, product manufacturers have traditionally worked two different paths of counter measures: —First, they have added built-in support for renewability, which means a mechanism to update the software of the device in the field with patches to the current threat; —Second, they have made their system more resistance to crypto analysis and attack. When applied to software, this means the uses of obfuscation techniques that makes the reverse analysis of the software more difficult. Today's obfuscation techniques come at the cost of increased size of software image and loss of performances. The present invention proposes an alternate solution that limits the reach of the attack by reducing the ability of the attacker to contaminate multiple devices: The invention creates a unique bundle between the security application software and unique parameters it requires to identify the device in the network.

SUMMARY OF THE DESCRIPTION

Methods and apparatuses for configuring products for security are described here. Some of the embodiments of the present invention are summarized in this section.

In one aspect of an embodiment of the present invention, a method of manufacturing a product, includes: establishing a connection between a data processing system and the product while the product is being manufactured; determining a first executable code for the product, the first executable code being one of a plurality of different executable codes; loading a first set of identifier information in a format compatible with the first executable code into the product; and loading the first executable code into the product. The first executable code may be determined non-randomly or randomly.

In one example of an embodiment, the first set of identifier information is capable of being used to control distribution of media which is received by the product; the first set of identifier information is unique relative to other products which are otherwise the same as the product; and the first set of identifier information is used to decrypt or descramble media received by the product when in use. In one example, the method further includes verifying that an initial set of identifier information stored within the product is valid to establish a secure authenticated channel. In one example, the loading of the first set of identifier information is in response to validly verifying the initial set of identifier information; and the loading of the first set of identifier information is secured through the verifying of the initial set of identifier information.

In one example of an embodiment, the determining of the first executable code for the product comprises: randomly selecting a first compilation key from a plurality of different compilation keys; and modifying a reference execution code according to the first compilation key to generate the first executable code. In one example, multiple separate locations in the reference execution code are modified according to the first compilation key.

In one example of an embodiment, the determining of the first executable code for the product comprises: randomly selecting a first compilation key from a plurality of different compilation keys; and selecting the first executable code from the plurality of executable codes according to the first compilation key, where the plurality of executable codes are generated according to the plurality of compilation keys respectively.

In one example of an embodiment, the plurality of executable codes have a same overall functionality but different operations which generate different results from the same input data. In one example, the plurality of different executable codes have different instructions to perform different algorithmic operations. In one example, the plurality of different executable codes have differences in multiple locations in instruction sequences.

In one example of an embodiment, each of the plurality of executable codes computes a key for decrypting identifier information stored on the product using a different algorithm which generates a different result from the same input data; and the first set of identifier information in the format is decryptable with a key computed using the first executable code but not decryptable using a key computed using one of the plurality of executable codes that is different from the first executable code.

In one aspect of an embodiment of the present invention, a method to configure a device, includes: determining a first executable code for the device, the first executable code being one of a plurality of different executable codes that are capable of being executed on the device, the plurality of executable codes having a same overall functionality but different operations which generate different results from same input data; and loading the first executable code into the device. In one embodiment, the plurality of different executable codes occupies the same size of storage space.

In one example of an embodiment, the first executable code is a random one from the plurality of different executable codes. In one example, the method farther includes randomly selecting a first set of information (e.g., a compilation key or a set of compilation options) from a plurality of sets of information; the first executable code is generated based on the first set of information; and the plurality of different executable codes are generated based on the plurality of sets of information respectively.

In one example of an embodiment, the method further includes verifying that an initial set of identifier information stored within the device is valid to establish a secure authenticated channel; and loading a new set of identifier information in a first format compatible with the first executable code into the device over the secure authenticated channel; where the first executable code is also loaded into the device over the secure authenticated channel. In one example, any one of the plurality of different executable codes other than the first executable code is not compatible with the first format; and the first format is an encrypted format.

In one example of an embodiment, the method further includes loading data in a first format into the device. The first format is one of a plurality of different formats; the first executable code is compatible with the first format; any of the plurality of different executable codes other than the first executable is not compatible with the first format.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least one embodiment of the present invention seeks to secure the process of configuring products (e.g., digital television receivers), in which information for authentication and for secure communication is individually loaded into each of the products (e.g., typical when the product is being produced at some stage of a manufacturing process). In one embodiment of the present invention, information for establishing a secure authenticated channel is installed into the products using a secure authenticated channel in a serialization process while the products are in a manufacture facility. In one embodiment of the present invention, the information for establishing a secure authenticated channel includes information for uniquely identify each of the products. In one embodiment, the same communication protocol and security techniques for establishing a secure authenticated channel for the protection of the contents transmitted over the insecure media are used to transmit the identifier information to the products for serialization. Since the same communication protocol and security techniques are used in the configuration process, the configuration information transmitted for serialization is protected at least to a level the contents are protected during the typical usage of the products.

Figure 2:
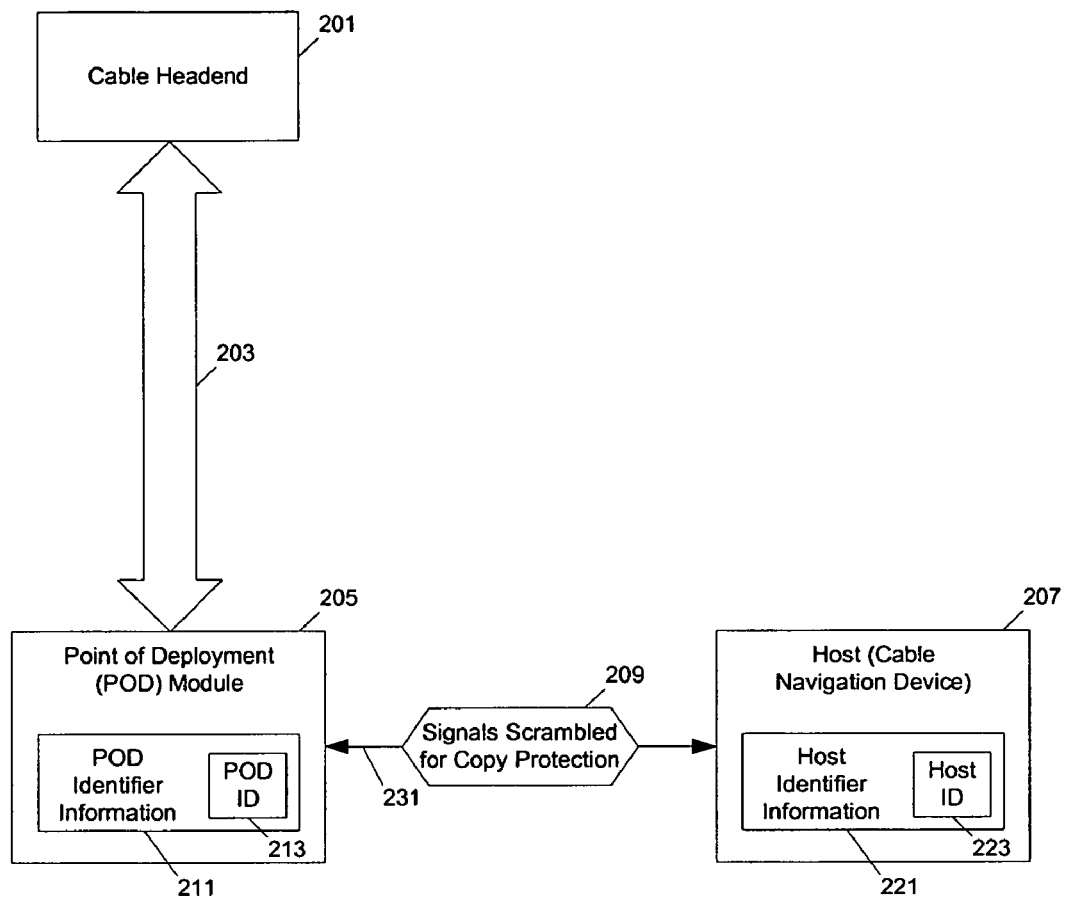
FIG. 2 shows a diagram of a system with a copy protection scheme which may be used with the present invention.

Some examples are illustrated through the copy protection system of a digital cable system. FIG. 2 shows a diagram of a system with a copy protection scheme which may be used with the present invention. In FIG. 2, a Point of Deployment (POD) module (205), which may be referred to as a Cable-CARD™ or other device, is used to receive the signals protected by a conditional access scrambling system from a cable headend (201). The cable headend (201) transmits the scrambled digital cable signals to the viewers through the communication system (203, such as a cable network). The POD module is capable of being instructed by the cable headend to descramble the received content and re-scramble the content for delivery to a host (207). The host (207) is a cable navigation device, such as a digital television set (or a set-top box). Each of the POD module and the host has an identity. Typically, the host has a unique identity; and the identity of the POD module is also typically unique. The unique identity of the host is implemented on the host so that it cannot be easily changed or cloned.

For example, the POD module (205) has POD identifier information (211) which includes a POD ID (213); and the host (207) has host identifier information (221) which includes a host ID (223). At least a portion of the identifier information is in the form of a digital certificate, signed by a certificate authority. Using a signature verification technique, the POD and the host verify each other's certificate. The POD ID and the host ID are then reported to the cable headend (201). The reporting of the POD ID and the host ID may be performed automatically through a two-way communication channel or manually (e.g., through a phone call to the operator of the cable company when the POD cannot communicate the POD ID and the host ID to the cable headend through the communication system (203)). If the host attached to the POD module is allowed to view the content, the cable headend transmits data to the POD so that the POD is allowed to remove the conditional access scrambling. For contents that need copy protection, the POD module (205) re-scrambles the content before delivery to the host (207). On the communication medium (231) between the POD module (205) and the host (207), the signals (209) are scrambled for copy protection. Further details about the security mechanisms for copy protection between the POD module (205) and the host (207) can be found in ANSI/SCTE 41 2003.

To protect the content against unauthorized access through the data path (231), the host (207) is capable of using the host identifier information (221) to establish a secure authenticated communication channel over the data path (231) between the POD module (205) and the host (207); and this channel is used to exchange session keys and content protection information. In one exemplary method, a session key is used to scramble data across the data path; and the content protection information is used to instruct the host what can be done with the content. In one embodiment of the present invention, the same capability of the host is used for the configuration of the host identifier information (221).

Typically, different hosts have different host IDs. When each of the hosts has a unique host ID, the access to the contents can be controlled based on the host ID. Thus, the hosts are typically assigned unique identities before being shipped to end-users. One embodiment of the present invention uses the built-in security capability of the hosts to communicate the unique identities from a server to the hosts through secure authenticated channels established over a communication medium which may not be physically secure. In this way, the identifier information is protected against unauthorized access during the serialization process.

Figure 3:
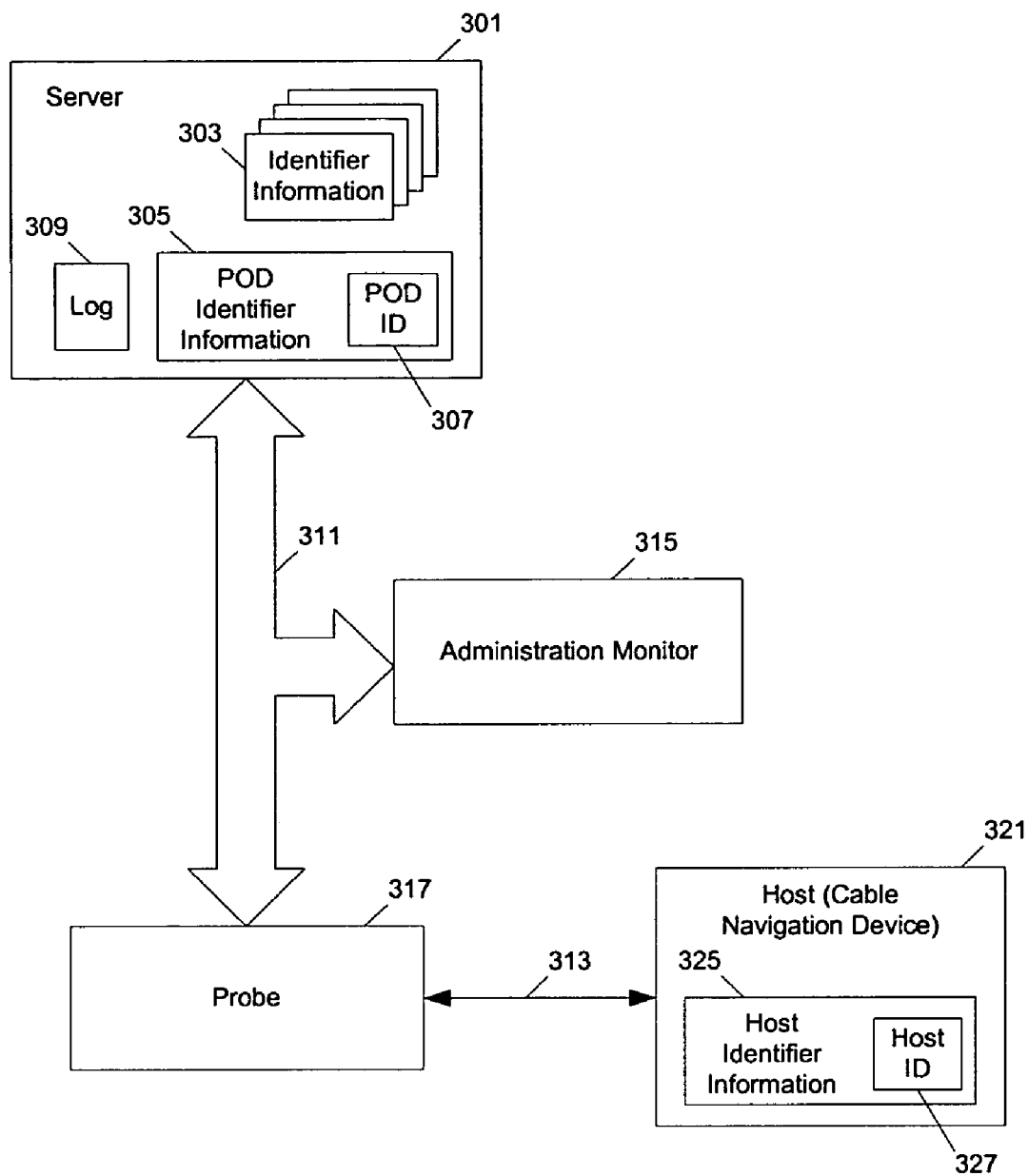
FIG. 3 shows a block diagram representation of a system for product serialization according to one embodiment of the present invention.

FIG. 3 shows a block diagram representation of a system for product serialization according to one embodiment of the present invention. In FIG. 3, a server (301) has unique identifier information (303) which is to be loaded into hosts. The host (321), such as a cable navigation device, may be one of the products on an assembly line. A probe (317) is used to physically connect the host (321) to the network (311), which further connects to the administration monitor (315) and the server (301). The probe connects the host (321) to the server and the administration monitor to perform various tests. An operator may use the administration monitor (315) to monitor the progress of the tests, the test results, as well as the progress of the serialization process. Confidential information (e.g., identifier information (303)) is stored in the server. The identifier information (303) is communicated to the host (321) only through a secure authenticated channel established using the POD identifier information (305) and the host identifier information (325). The secure authenticated channel is established over the network (311) and probe (317) using the copy protection mechanism that the host (321) uses to communicate with a POD security module.

In one embodiment of the present invention, a number of products are initially loaded with the same identifier information. Since these products have the same identifier information, a content provider (e.g., a cable television operator) cannot tell one host from another. Such configured products are normally not suitable for distribution to the end users. To serialize the products, each of these products is assigned unique identifier information so that a content distribution network can tell one host from another. Once the products are serialized, access to the contents can then be controlled based on the unique identifier information. In one embodiment of the present invention, the server (301) is connected through the probe (317), one at a time, to the products that are initially loaded with the same identifier information. In one embodiment, the probe (317) has the same physical interface (313) to the host (321) as the POD-host interface or it may have an alternative physical interface. After the probe is connected to the host (321), the firmware of the host (321) may be upgraded if necessary. Tests are performed on the host (321) to check if the host (321) functions properly.

Then, according to the POD-host communication protocol (e.g., copy protection protocol), a secure authenticated communication channel is established to communicate one of the unique identifier information 303 to the host (321). After the host (321) has the new, unique identifier information, the server recreates a secure authenticated communication connection with the host using the new identifier information and verifies that the host functions properly with the new identifier information. The server records on a log (309) the test results and the assignment of the new identifier information. The log (309) can be a file on the server or an entry of a database. Note that the log (309) can be maintained on a data processing system separate from the server (301). The log may include the information about the product, such as the serial number of the product. Some products have electronic serial numbers, which can be automatically collected and associated with the newly assigned identity information in the log. The server (301) may obtain the identifier information (303) from an online certification store, or a database on an intranet, or from a removable machine readable medium, such as an optical diskette or a removable disk drive.

In one embodiment of the present invention, one server (e.g., 301) can simultaneously control multiple probes (e.g., 317) for configuring multiple hosts (e.g., on multiple assembly lines). The probes have different identifiers (e.g., different network addresses) so that the server can maintain multiple separate simultaneous connections to multiple hosts that have the same initial identifier information. Each of the probes may be connected to a corresponding one of the administration monitors to display the test results and to show the progress in the configuration process. Alternatively, one administration monitor may be used to monitor the test results from several probes. The administration monitor may receive information directly from the probe, or indirectly from the server, or in combination to generate the display. When the server and the host establish a secure authenticated communication channel for assigning the identifier information, neither the probe (317) nor the administration monitor (315) (nor other devices attempting to spy) can gain access to the identifier information, since the identifier information is protected at least by the copy protection mechanism.

Figure 4:
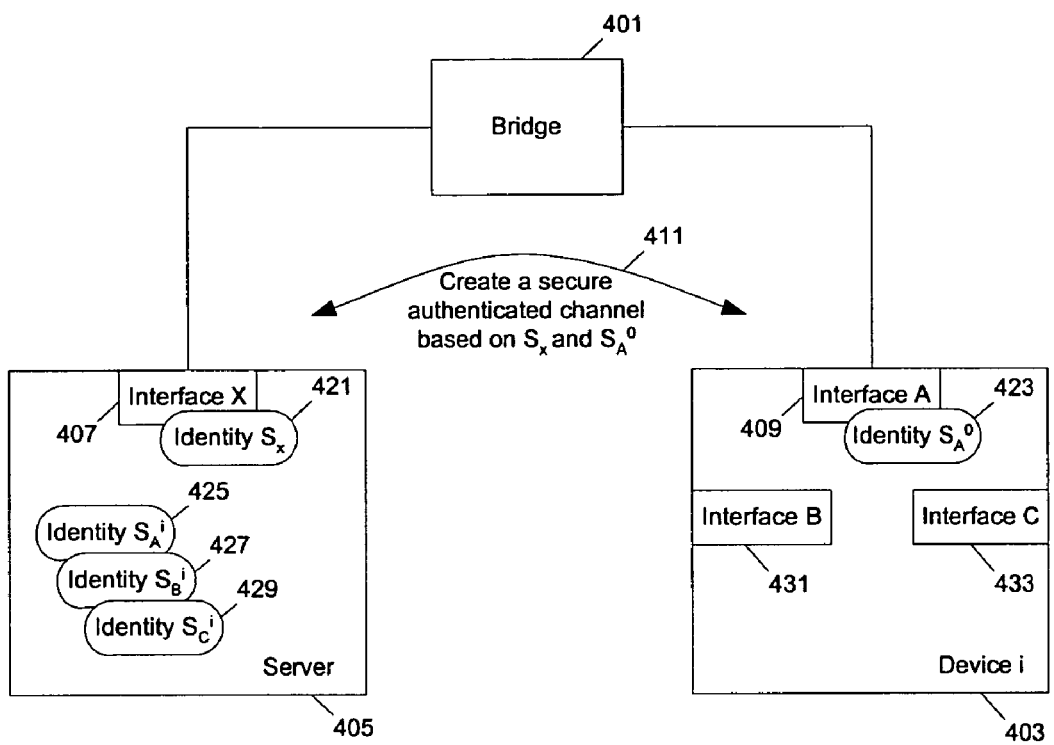
FIGS. 4-7 illustrate the process of product serialization according to one embodiment of the present invention.
Figure 5:
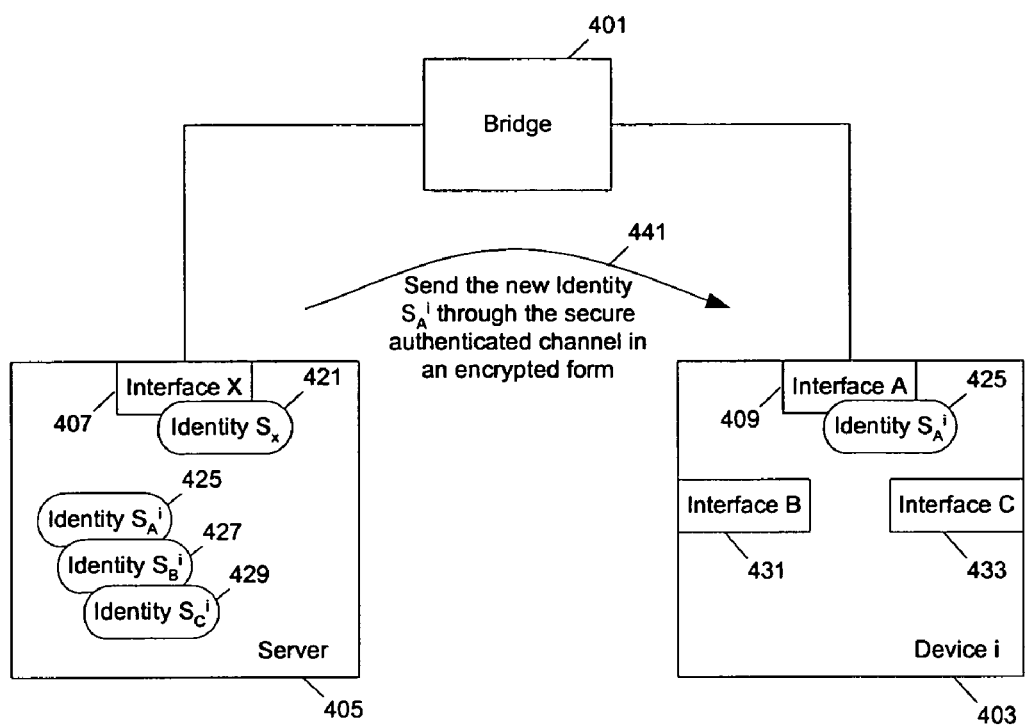

FIGS. 4-7 illustrate the process of product serialization according to one embodiment of the present invention. In FIG. 4, the device i (403) is initially loaded with an identity $S_A^0$ (423). The initial identity $S_A^0$ (423) can be the same for a number of devices (i=1, 2, ..., n). For example, a manufacture may assign each of the subcontractors one initial identity for their products. The manufacture may periodically (e.g., once a month) change the initial identity for the products; and the initial identity expires in a short period of time. In one embodiment of the present invention, the initial identity does not contain any secret information that is used in "real-life" service. For example, the initial identity does not contain the keys and the system parameters (e.g., those for Diffie-Hellman) that will be used in "real-life" service. Instead, a different set of keys and parameters may be used for configuration purpose only, which will not be valid in a real digital cable system. These keys and parameters may be generated on the server (405) for the configuration purpose only. Such keys and parameters are compatible with the security capability of the POD-host interface so that secure authenticated channels can be made using the same security capability of the POD-host interface for the serialization (e.g., loading the unique real-world identity into the device through the bridge (401) between the server (405) and the device (403)). The bridge may be simply a communication cable, or a path including a network (e.g., intranet or Internet). For example, in FIG. 3 probe (317) and/or a portion of the network (311) can be considered the bridge.

After the bridge (401) connects the server (405) to the device (403), the server and the device create (411, see FIG. 4) a secure authenticated channel based on the verification of the identities $S_x$ (421) and $S_A^0$ (423). In one embodiment of the present invention, the authentication process is performed as if the server were a POD module (from the host's point of view). The same security protocol and connection algorithm for POD-host binding is used to establish the secure communication channel over the bridge (401). The bridge (401) may not be physically secure. However, the security protocol and connection algorithm for the POD-host binding, which protect the cable content against unauthorized access in the copy protection system, are used to secure the data transferred over the bridge (401). Thus, a new identity can be securely sent over the bridge (401).

After the secure authenticated channel is established, the server sends (441, see FIG. 5) the new, unique identity $S_A{}^i$ (425) to the device (403) through the secure authenticated channel in an encrypted form over the bridge (401). Thus, the secret information for the identity $S_A{}^i$ is protected against unauthorized access during the transmission from the server to the device (403). On the device i (403), the new identity $S_A{}^i$ (425) replaces the initial identity $S_A{}^o$ (423). This replacement may involve erasing the initial identity; alternatively, this replacement may not erase the initial identity (e.g., it may be merely marked as "invalid" or "old").

Figure 6:
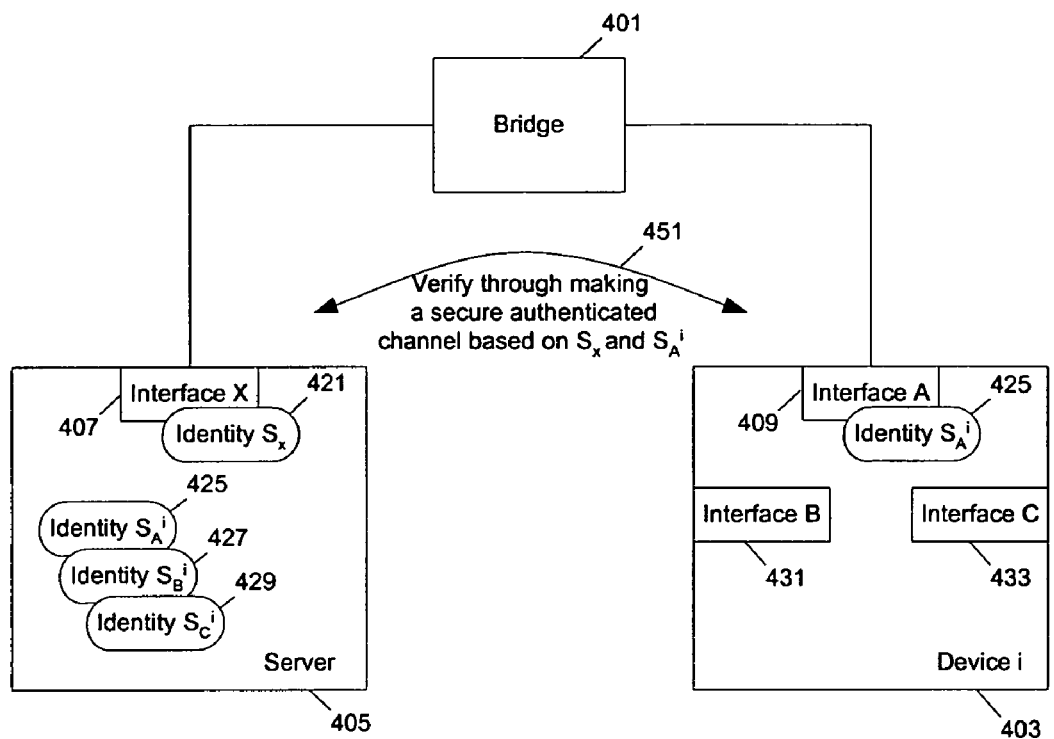
Figure 7:
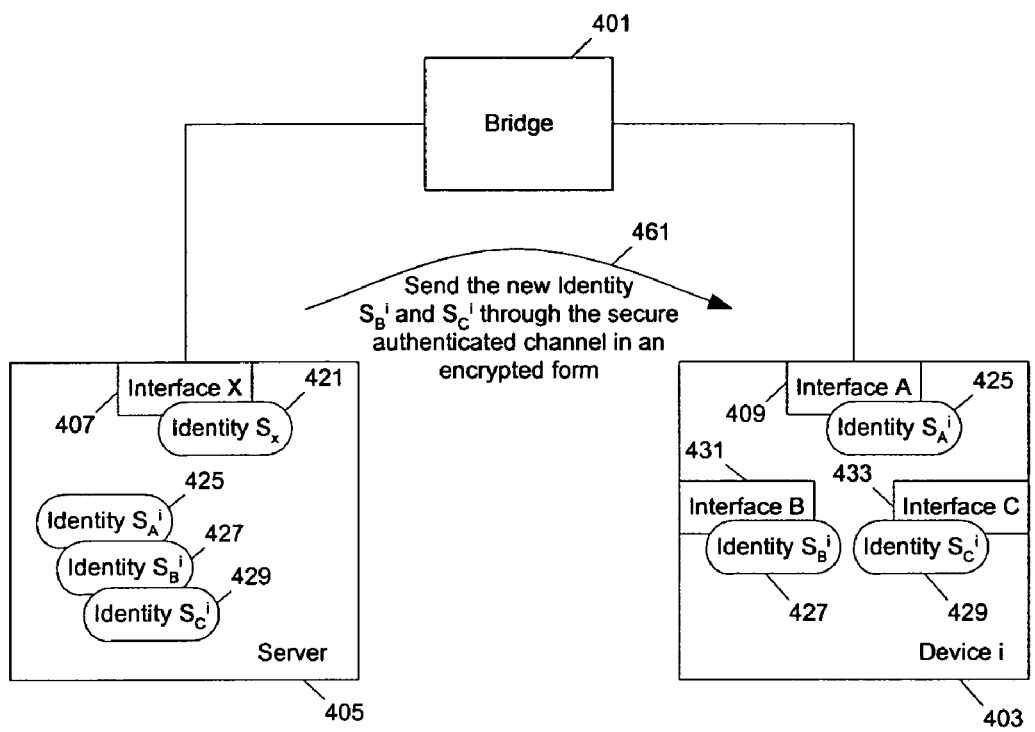
Figure 8:
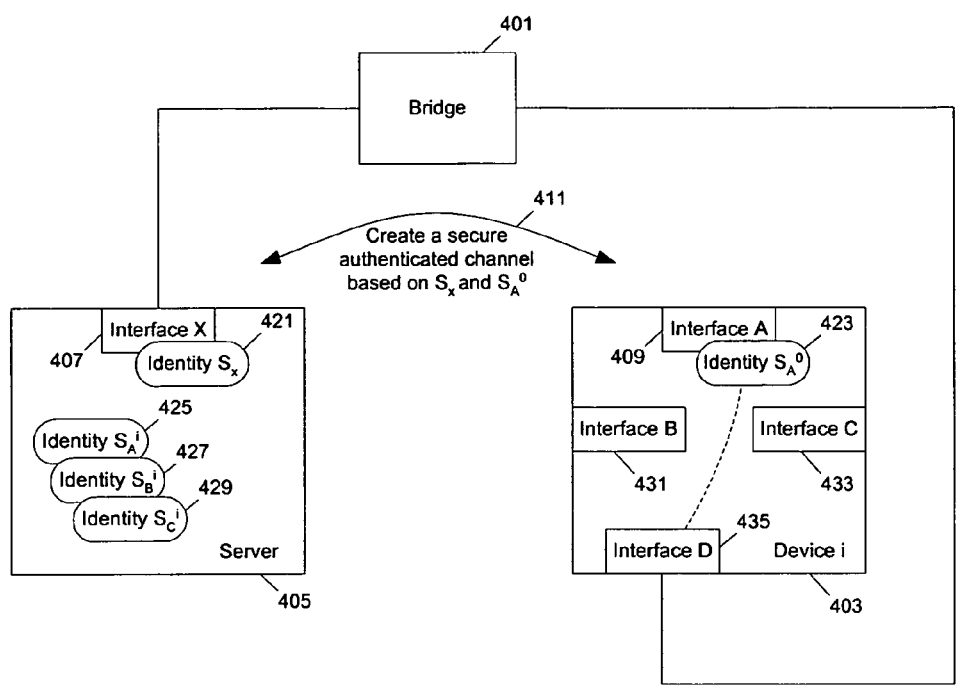
FIGS. 8-11 illustrate the process of product serialization according to another embodiment of the present invention.

After the device (403) assumes the new identity $S_A{}^i$ (425), the server (405) makes a new secure authenticated channel based on $S_x$ and $S_A{}^i$ to verify that the device (403) is functioning properly (451, see FIG. 6). In one embodiment of the present invention, the identities for the serialization process and the identities for the final products use different sets of parameters (e.g., public keys for signature verification and parameters for Diffie-Hellman key exchange). Thus, after the device assumes the new identity $S_A{}^i$ (425), the server uses a different identity (e.g., $S_x{}^d$) that is compatible with the new identity $S_A{}^i$ (425) during the verification process. Alternatively, the initial identity $S_A{}^o$ (423) may be such that the same identity $S_x$ can be used for connection with both $S_A{}^o$ (423) and $S_A{}^i$ (425).

In one embodiment of the present invention, the device (403) has multiple interfaces, such as interface A (409), interface B (431) and interface C (433). For example, a digital television set may have interfaces including: a CableCARD, cable (HFC, Hybrid Fiber Coax), an IEEE-1394 port, a Digital Video (DV) port (e.g., Digital Video Broadcasting Common Interface (DVB-CI)), an Ethernet port, etc. Each of the interfaces may need a separate unique identity (e.g., for copy protecting the content when transmitting from one port to another within the host, or when receiving at these ports, or when storing the content). Each of the physical interfaces may use a common security system with an associated identity. The security system and an associated unique identify can be used with one interface or other interfaces. A security system intended for one physically interface can be temporarily used with another physically interface (e.g., for serialization). The server (405) has unique identities (425, 427 and 429) for the interfaces (423, 431 and 433). After establishing a secure authenticated channel over the bridge (401), such as using $S_x$ and $S_A{}^o$ (or $S_x$ and $S_A{}^i$), identities $S_B{}^i$ (427) and $S_C{}^i$ (429) can also be sent securely (461, see FIG. 7) over the bridge (401) to the device (403) for installation.

Alternatively, one certificate, which is compatible with a POD security module, may be designated as the initial identity. Further, such a certificate can be used with a POD module to perform serialization while the product is in the possession of an end user. This serialization may occur when initially possessed or after a period of possession (e.g., for upgrading an identity of a host in the field which is being used by a user, such as when the lifetime of the certificate has expired or when some copy protection secrets need to be renewed). For example, a POD module according to one embodiment of the present invention can be used to descramble a new set of identifier information transmitted from a cable headend for the POD module and to securely transfer the identifier information to the host, when the POD module determines that the host is a legitimate one for serialization. The POD module may automatically request for the new set of identifier information; alternatively, the POD module may cause the user to manually report the POD ID and Host ID (e.g., a cable company) to get a new set of identifier information installed into the host.

Figure 9:
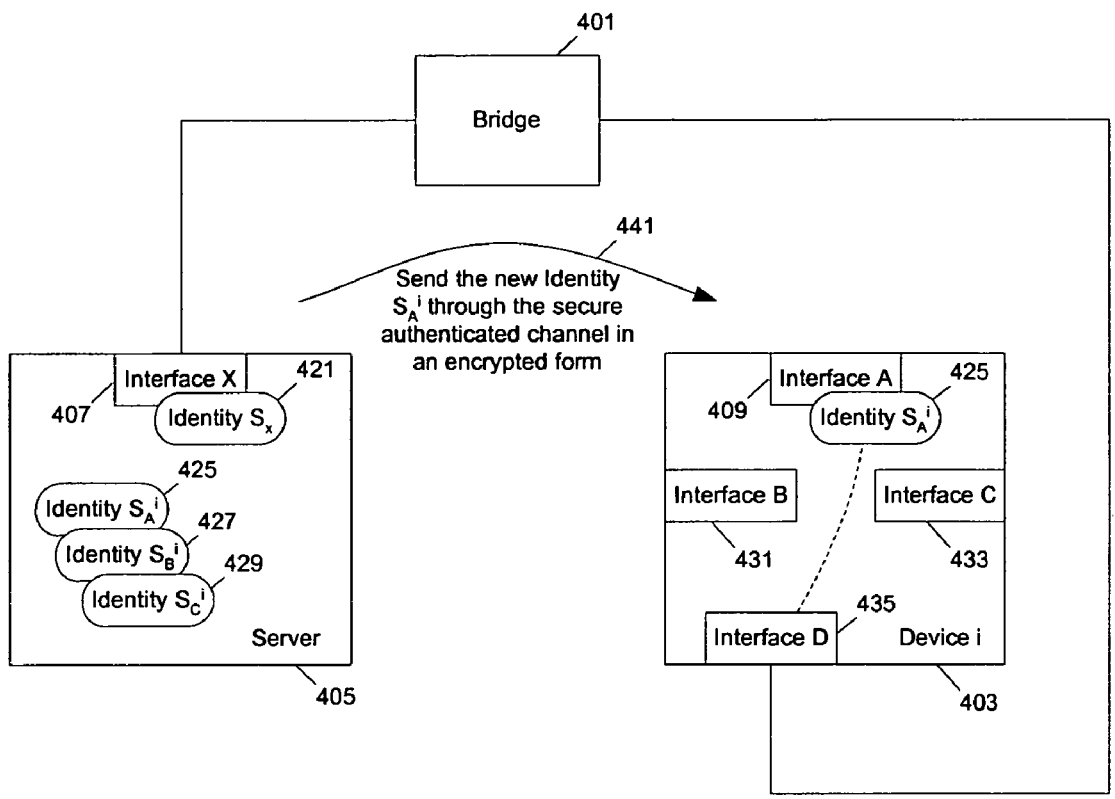
Figure 10:
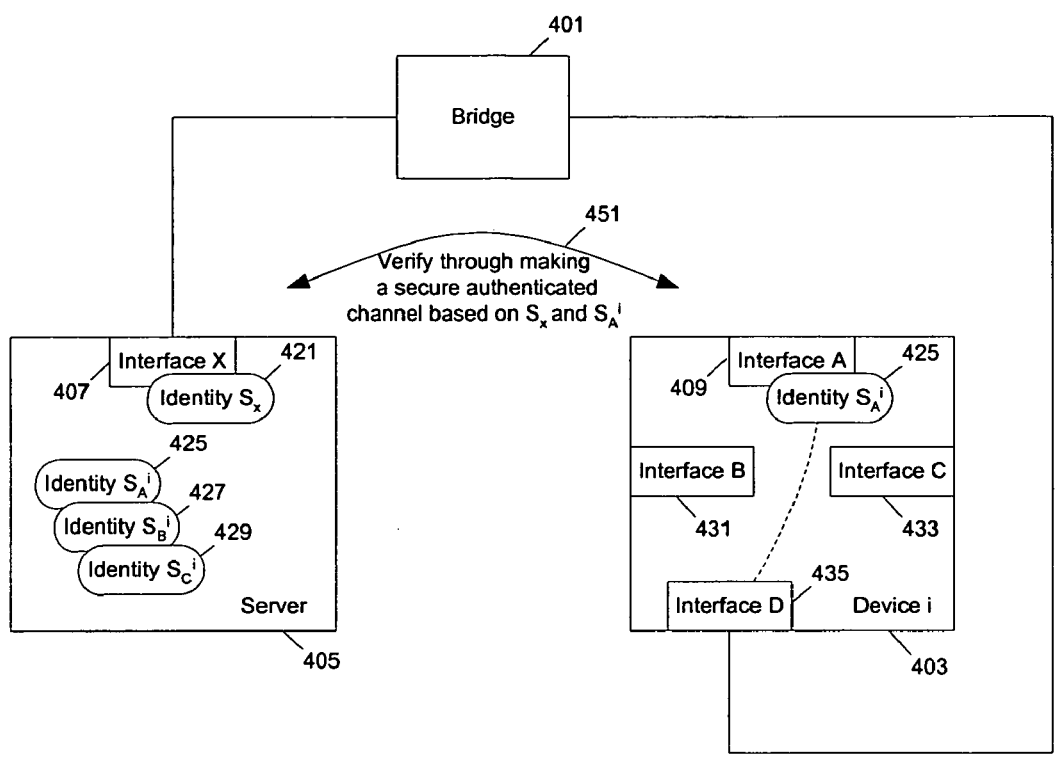
Figure 11:
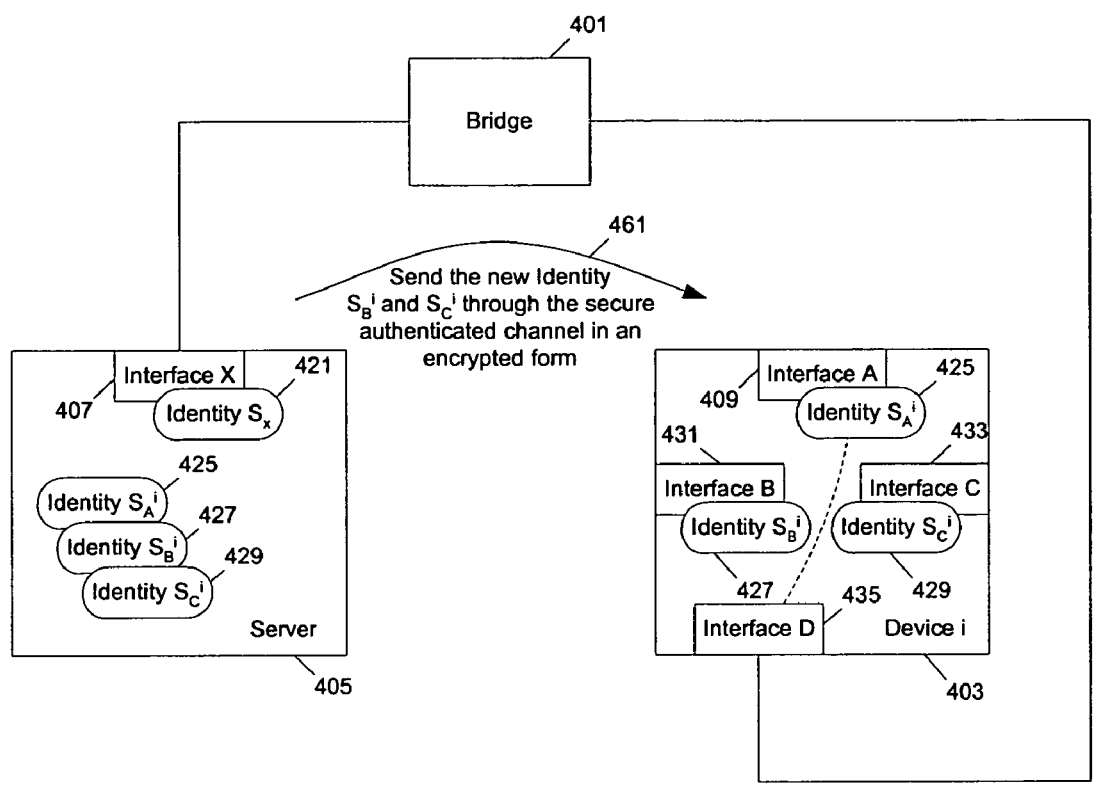

FIGS. 8-11 illustrate the process of product serialization according to another embodiment of the present invention. In FIGS. 8-11, the security system (e.g., copy protection protocol) intended for one physical interface (e.g., POD or Cable-CARD) is used on another physical interface (e.g., Ethernet) to serialize the product. For example, in FIG. 8, the device (403) is initially loaded with identity $S_A{}^o$ (423) for interface A (409). A copy protection communication protocol is implemented on the device for interface A (409) using identity $S_A{}^o$ (423). Interface D (435) (e.g., an Ethernet port) may or may not have a copy protection communication protocol implemented. In one embodiment of the present invention, the copy protection communication protocol designed for interface A (409) and its associated initial set of identity $S_A{}^o$ (423) are used on interface D to create (411) a secure authenticated channel over the bridge (401) between the server (405) and the device (403). In FIG. 9, the new identity $S_A{}^i$ (425) for interface A (409) is sent (441) from the server (405) to the device (403) through the secure authenticated channel in an encrypted form using interface D (435), where the secure authenticated channel is based on the copy protection communication protocol for interface A (425) and the initial set of identity $S_A{}^o$(423). In FIG. 10, the server verifies (451) the new identity of the device for interface A (409) through making a secure authenticated channel using interface D (435) and the copy protection communication protocol for interface A (425). Alternatively, the verification can be performed through a direct connection to interface A (425). The identity information can be designed so that the same identity $S_x$ (421) can be used in the server to connect to the device with the new identity. Alternatively, the initial identity and the new identity can be designed to have different sets of shared secrets so that after the new identity is installed on the device, a different identity compatible with the new identity is used at the server to make a secure authenticated channel after the new identity is installed on the device. FIG. 11 illustrates the loading of new identities $S_B{}^i$ (427) and $S_C{}^i$ (429) for interfaces B (431) and C (433) through interface D (435) using the copy protection communication protocol for interface A (425) and the identity intended for interface A. In one embodiment of the present invention, a device has multiple copy protection communication protocols for multiple physical interfaces respectively; and one of the multiple copy protection communication protocols and its associated initial identity can be selected to use on any of the physical interfaces for the serialization of the device.

Figure 12:
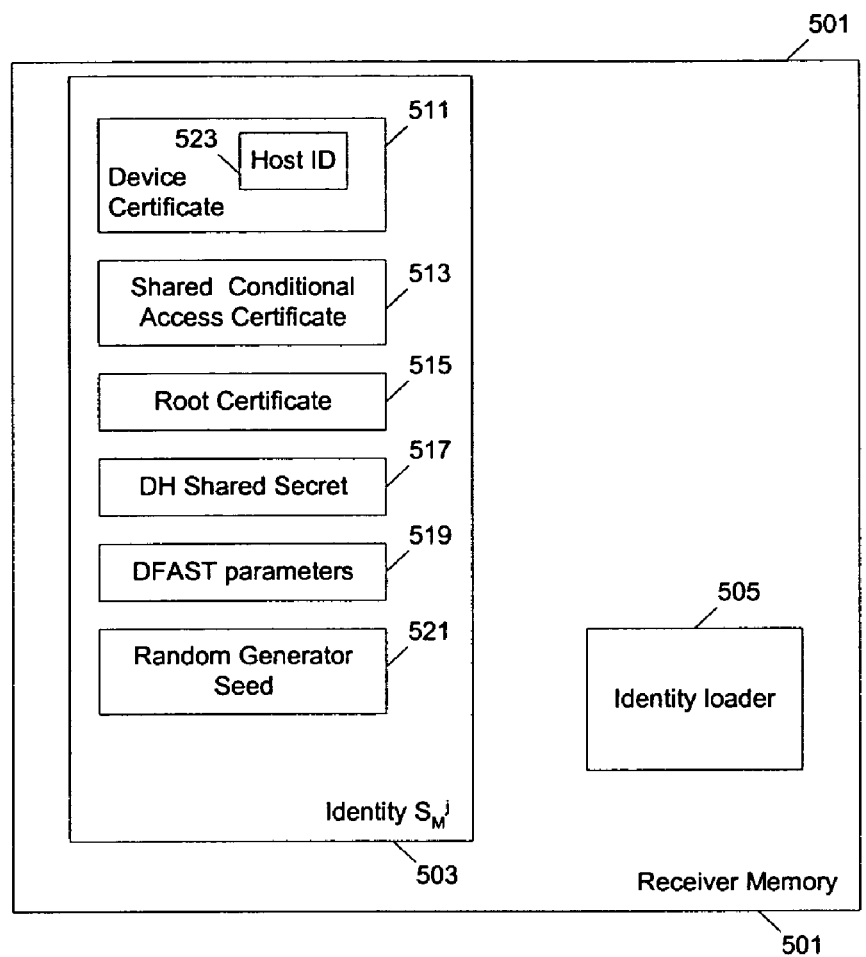
FIG. 12 illustrates the memory of a receiver according to one embodiment of the present invention.

FIG. 12 illustrates the memory of a receiver according to one embodiment of the present invention. A digital television receiver (e.g., 321 in FIG. 3 or 403 in FIG. 4) stores an identity loader (505) in the receiver memory (501). After the receiver obtains new identifier information (e.g., through the secure authenticated channel), the identifier loader (505) is then executed to replace the initial identifier information with the new identifier information.

As illustrated in FIG. 12, identifier information may include a device certificate (511), such as a certification in accordance with an International Telecommunication Union Telecommunication Standardization Sector (ITU-T) recommendation X.509 standard. The host ID (523) in the device certificate (511) of a production identity is used to identify the device. The host ID (523) of an initial identity can be chosen to indicate that the device is not serialized. In one embodiment, the device certificate (511) of the initial identity is not signed by a well known certificate authority; instead, the device certificate (511) of the initial identity is signed by a private key of the configuration server so that the device certificate (511) of the initial identity will not be accepted by a POD security module.

The identity $S_M^j$ (503) may include secret information, such as Diffie-Hellman (DH) shared secret (517), DFAST (Dynamic Feedback Arrangement Scrambling Technique) parameters (519), random generator seed (521). The identity $S_M^j$ may further include information, such as shared conditional access certificate (513) and root certificate (515). In one embodiment of the present invention, the secret information of the identity is maintained in the receiver memory (501) by a software program (not shown in FIG. 12) in an encrypted form to prevent unauthorized access.

The identity $S_M^j$ (503) is typically stored in a non-volatile memory of the receiver, such as a flash memory integrated circuit. The memory may further store the instructions for processing multimedia signals, such as firmware, including the identity loader (505).

Figure 13:
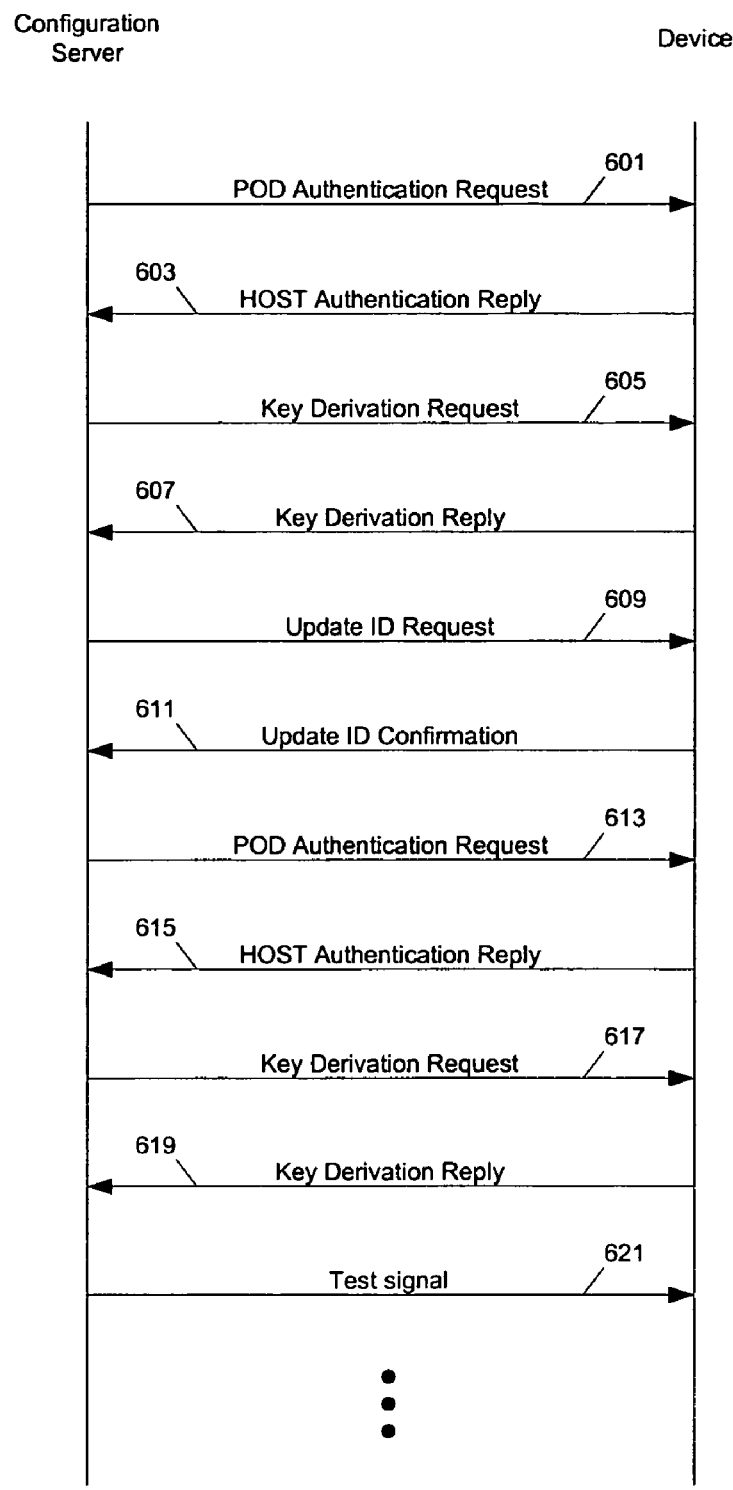
FIG. 13 illustrates the messages transmitted between a configuration server and a device to be configured according to one embodiment of the present invention.

FIG. 13 illustrates the messages transmitted between a configuration server and a device to be configured according to one embodiment of the present invention. In one embodiment of the present invention, the configuration server (e.g., 301 in FIG. 3 or 405 in FIG. 4) emulates a POD module to communicate with the device (e.g., 321 in FIG. 3 or 403 in FIG. 4) using the POD-host protocol in a POD copy protection system (e.g., as specified in ANSI/SCTE 41 2003). The server sends a POD authentication request (601) to the device; and the device sends a HOST authentication reply (603) back to the server. It is understood that the POD authentication request (601) and the HOST authentication reply (603) are used to represent the messages exchanged for the authentication process, which may include the exchange of a number of messages. For example, the authentication process may include the exchange of device certifications and the exchange of messages for the verification of an authentication key to resist "Man in the Middle" attacks.

The configuration server sends a key derivation request (605) to the device; and the device sends a key derivation reply (607) back to the configuration server. Through key derivation messages, the server and the device can derive a shared secret session key (e.g., according to Diffie-Hellman) for the secure exchange of further messages.

The configuration server sends an update ID request (609) to the device using the secure communication channel established through the authentication messages and the key derivation messages. The update ID request includes the new identification information transmitted in an encrypted format to the device. After the device successfully changes its identifier information (e.g., using the identity loader (505) in FIG. 12), the device sends an update ID confirmation (611) back to the configuration server.

Once the device has the new identity installed, the configuration server can test the device. The configuration server emulates a POD security module to make a secure authenticated connection with the device through sending a POD authentication request (613), receiving a HOST authentication reply (615), sending a key derivation request (617) and receiving a key derivation reply (619). If the secure authenticated connection to the device with the new identifier information is successful, the configuration server sends test signals (scrambled for copy protection) to the device (621), emulating a POD security module providing the scrambled signals to the device according to the copy protection system. The device may be shipped to the end users if the device passes the test.

Figure 14:
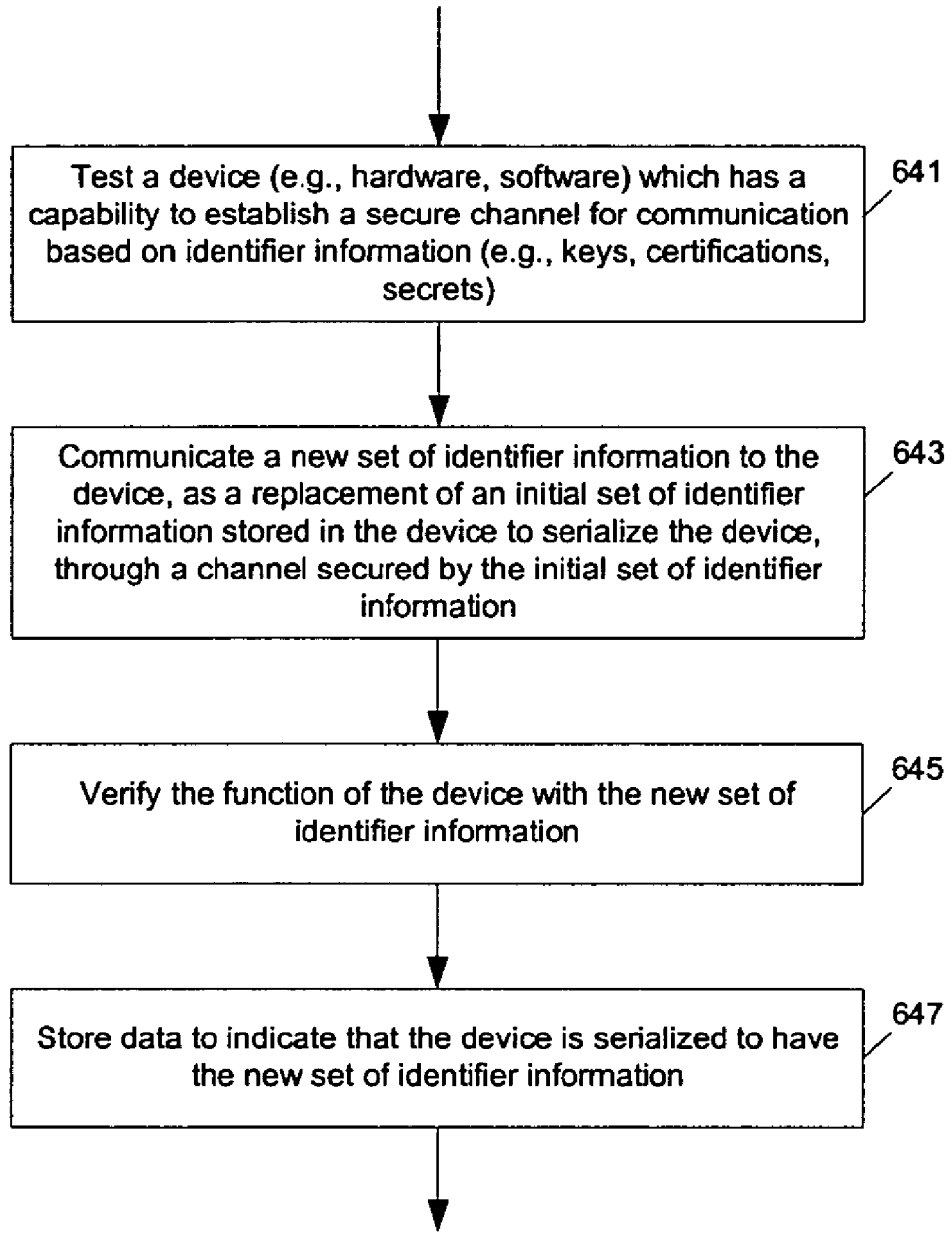
FIG. 14 shows a flow chart of a method to configure a device according to one embodiment of the present invention.

FIG. 14 shows a flow chart of a method to configure a device according to one embodiment of the present invention. Operation 641 tests a device (e.g., hardware, software) which has a capability to establish a secure channel for communication based on identifier information (e.g., keys, certifications, secrets). The device can be tested for hardware functionality and software/firmware integrity. For example, during a software test, the version number of the software/firmware can be checked. If the software/firmware installed on the device is outdated, the current version of the software/firmware is loaded into the device. Operation 641 may be done before operation 643 or after operations 643, 645 and/or 647. Operation 643 communicates a new set of identifier information to the device, as a replacement of an initial set of identifier information stored in the device to serialize the device, through a channel secured by the initial set of identifier information. Operation 645 verifies the function of the device with the new set of identifier information. The verification process may include the verification of the new identity information and further testing of the device. At least some of the tests can be performed either before or after the serialization. Operation 647 stores data to indicate that the device is serialized to have the new set of identifier information. The data may include the serial number (or an electronic serial number) of the device the initial set of identifier information and the new set of identifier information. The data may be maintained in a database for a period of time (e.g., 25 years). Some of the tests of the device can be performed before the serialization or after the serialization.

The serialization can be performed during the final assembly phase, in which the entire product is assembled. After the serialization and testing, the products may be ready for delivery to users. Alternatively, the serialization can be performed during the subassembly phase, in which only a portion of the final product is assembled. For example, after the data processing module of a digital television set is assembled (e.g., without the screen and a power supply and a few other components), the data processing module can be tested and serialized. After the serialization and testing of the data processing module, a final assembly phase may be required to assemble the complete digital television sets before delivery to users. Thus, the serialization can be performed before or after the final assembly and may be performed before or after the delivery of the product. If the product fails a test, the product is not serialized or delivery to users.

Figure 15:
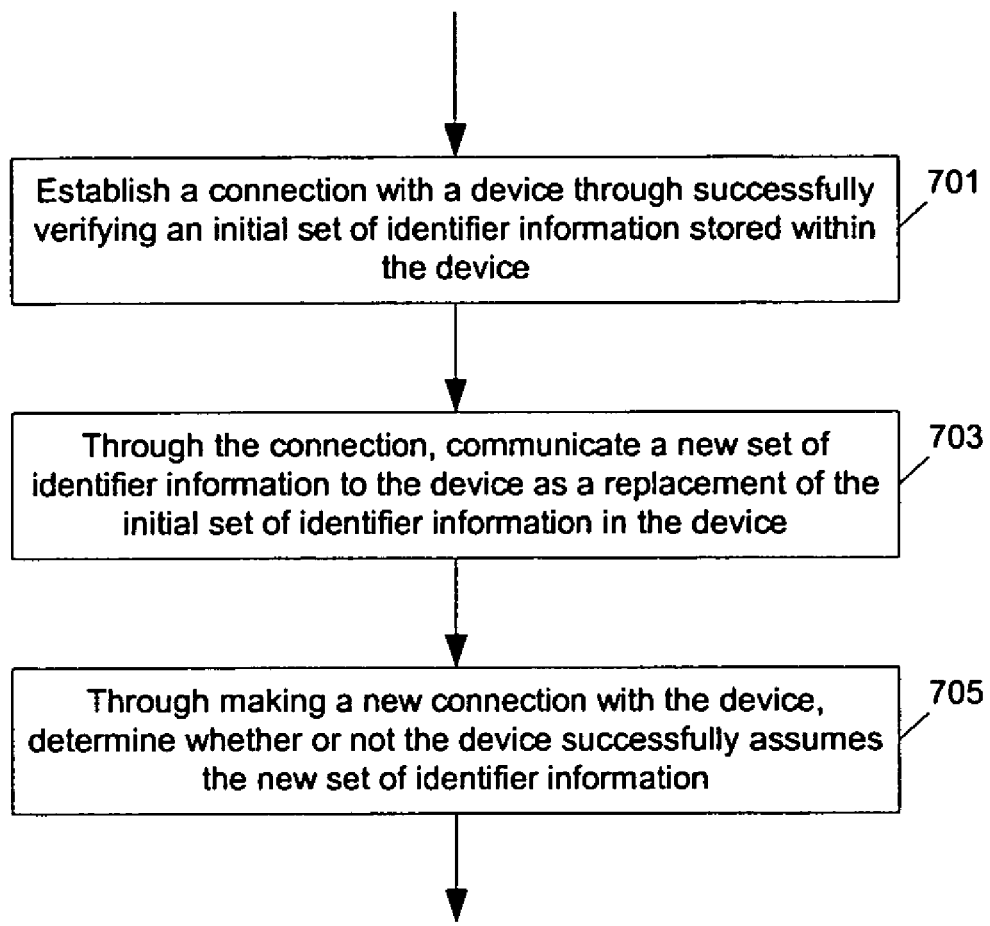
FIG. 15 shows a flow chart of a method of a server configuring a device according to one embodiment of the present invention.

FIG. 15 shows a flow chart of a method of a server configuring a device according to one embodiment of the present invention. Operation 701 establishes a connection with a device through successfully verifying an initial set of identifier information stored within the device. Through the connection, operation 703 communicates a new set of identifier information to the device as a replacement of the initial set of identifier information in the device. Through a new connection with the device, operation 705 then determines whether or not the device successfully assumes the new set of identifier information. The successful assignment of the new set of identifier information to a device can be logged in a file or in a database.

Figure 16:
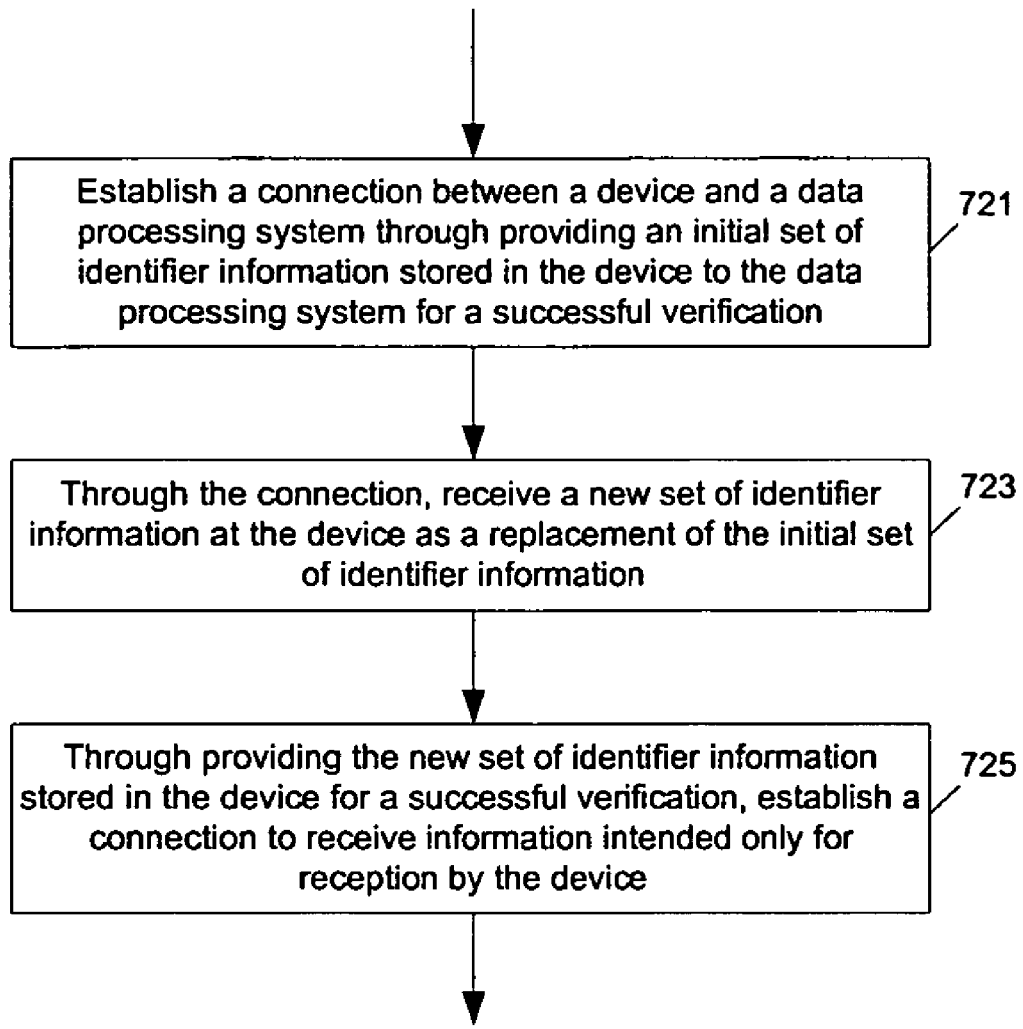
FIG. 16 shows a flow chart of a method of a device changing identity according to one embodiment of the present invention.

FIG. 16 shows a flow chart of a method of a device changing identity according to one embodiment of the present invention. Operation 721 establishes a connection between a device and a data processing system through providing an initial set of identifier information stored in the device to the data processing system for a successful verification. Through the connection, operation 723 receives a new set of identifier information at the device as a replacement of the initial set of identifier information. Through providing the new set of identifier information stored in the device for a successful verification, operation 725 establishes a connection to receive information intended only for reception by the device. The connection made through the new set of identifier information may be for the verification purpose or for use with "real-life" usage.

Figure 17:
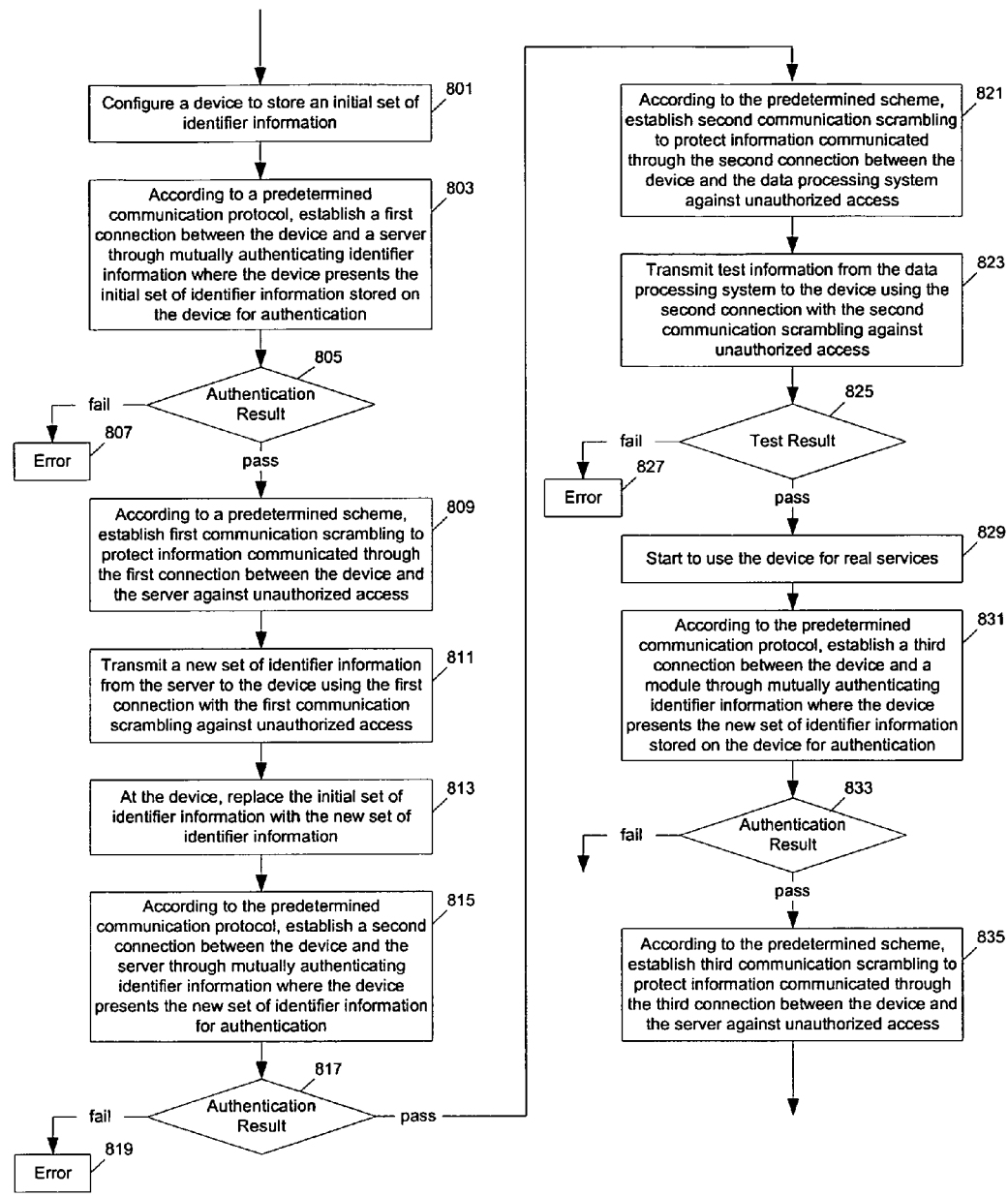
FIG. 17 shows a detailed example of product serialization according to one embodiment of the present invention.

FIG. 17 shows a detailed example of product serialization according to one embodiment of the present invention. Operation 801 configures a device to store an initial set of identifier information. The initial set of identifier information can be assigned to a large number of devices. Since the initial set of identifier information is not intended for "real-life" usage, multiple devices can share the same identifier information. To individually identify each of the devices, a serialization process is performed. According to a predetermined communication protocol, operation 803 establishes a first connection between the device and a server through mutually authenticating identifier information where the device presents the initial set of identifier information stored on the device for authentication. The server does not serialize the product if the product cannot show that it is a product to be initialized. The product refused to be initialized if the server cannot show that it is a legitimate server for serializing products. Thus, the process continues according to the authentication result (805). If the authentication fails, there is an error (807, e.g., error in the server or in the product); otherwise, according to a predetermined scheme, operation 809 establishes first secure authenticated channel (with communication scrambling, e.g., encryption) to protect information communicated through the first connection between the device and the server against unauthorized access. Operation 811 transmits a new set of identifier information from the server to the device using the first connection with the first secure authenticated channel (with communication scrambling) against unauthorized access. At the device, operation 813 replaces the initial set of identifier information with the new set of identifier information.

After the device installs the new set of identifier information, according to the same predetermined communication protocol, operation 815 establishes a second connection between the device and the server through mutually authenticating identifier information where the device presents the new set of identifier information for authentication. The process continues according to the authentication result (817). If the authentication failed, there is an error (819) during the serialization; otherwise, according to the predetermined scheme, operation 821 establishes second communication scrambling to protect information communicated through the second connection between the device and the data processing system against unauthorized access. Operation 823 transmits test information from the data processing system to the device using the second connection with the second communication scrambling against unauthorized access. The process then continues according to the test result (825). If the test failed, there is an error (827) in the system; otherwise, the device may be used for real services (829).

When the product is used for real services, according to same the predetermined communication protocol, operation 831 establishes a third connection between the device and a module through mutually authenticating identifier information where the device presents the new set of identifier information stored on the device for authentication. The process continues according to the authentication result (833). If the authentication failed, the device cannot be connected to the module to receive contents; otherwise, according to the predetermined scheme, operation 835 establishes third communication scrambling to protect information communicated through the third connection between the device and the server against unauthorized access. The device can then receives contents according to the third communication scrambling from the module.

Thus, at least some embodiments of the present invention provide methods to securely serialize devices that include one or more content protect mechanisms for the content transmitted over a data path. The content protect mechanisms require the storage of unique per device secrets in the devices. Embodiments of the present invention make use of the content protect mechanisms to create a secure authenticated channel between a server and the device and securely transfer the unique per device secrets into the device through a data path suitable for product serialization. In one embodiment of the present invention, the server enumerates itself as a legitimate content source to deliver the unique per device secrets into the device in a fashion as secure as the delivery of the content. In one embodiment of the present invention, when the secure channel is established, the server delivers, in an encrypted form the unique secrets for all the content protection mechanisms of the device. In one embodiment of the present invention, once the protection mechanisms have been updated with their unique secrets, the server recreates the secure channel for verification purposes.

Note that the image loader (505) and the configuration server may implement an additional layer of protocol and/or data encryption/scramble scheme to enhance security. Note that, in FIG. 3, both identifier information (303), as the content to be delivered to the host (321), and the POD identifier information (305) are on the server (301). It is understood that the server (301) can use both the content protection measures of the POD module (205) and the content protection measures of the cable headend (201). For example, the server (301) may check the pair of the POD ID (301) and the Host ID (327) to determine if the new set of identifier information can be transmitted to the host. Alternatively, in one embodiment of the present invention, the POD identifier information is implemented on a POD module, instead of on a server; and the server communicates to the POD module using a security mechanism that is used to protect the content on the cable distribution system (e.g., 203 in FIG. 2). The server may perform additional authentication operations to enhance security for the serialization.

The above examples are illustrated as a process in a manufacture facility, where testing and serialization are performed at the same time (e.g., on an assembly line). It is understood that the serialization process is not limited to the manufacture facility. For example, the products may be initialized with the initial set of identifier information, which is compatible with typical POD security modules. When it is determined that the product is not serialized and serialization is required to access certain content (e.g., particular set of channels that require copy protection), the serialization of the product may then start. The unique identifier for the product can then be securely transmitted to the product for installation using the initial set of identifier information. Thus, the product can be serialized on demand.

Further, the process can also be used to change the identity of the product (e.g., for renewability) or for upgrading or downgrading the product after the product has been used (e.g., by an end user) after it was manufactured. For example, new unique identify information can securely replace the old unique identify information using the old unique identify information, when the certification expires or when new secret parameters are used.

Figure 18:
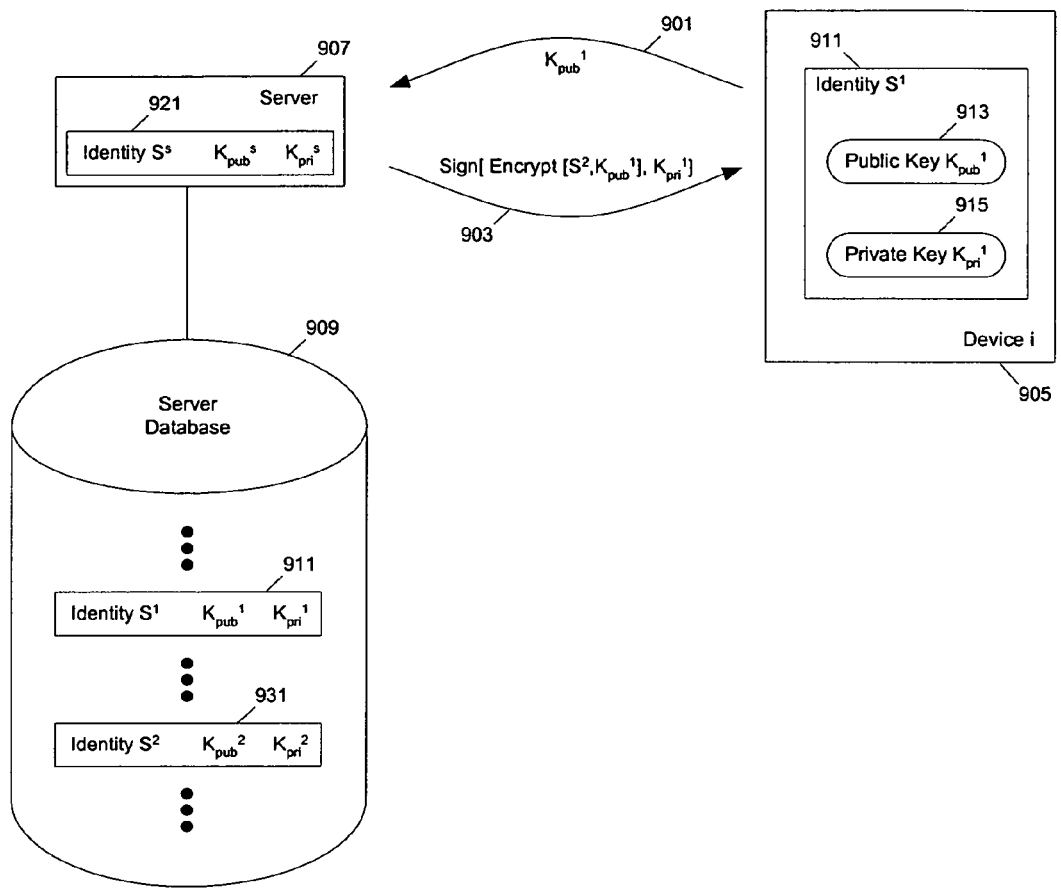
FIG. 18 shows a method to enhance security in the serialization of a device according to one embodiment of the present invention.

In one embodiment of the present invention, a further authentication process is implemented to prevent unauthorized changes to the identity of the product. For example, the device verifies that the new identity is from a server in possession of a secret of the device before using the received new identity to replace its current identity. FIG. 18 shows a method to enhance security in the serialization of a device according to one embodiment of the present invention.

In FIG. 18, the device (905) has identity $S^1$ (911) which includes public key $K_{pub}^1$ (913) and private key $K_{pri}^1$ (915). In the process of changing the identity of the device, the device (905) sends the public $K_{pub}^1$ (913) to the server (907). The server sends (901) the new identity $S^2$ (931) to the device to change its identity from identity $S^1$ (911) to identity $S^2$ (931). To ensure the authenticity of the new identity information received at the device (905), the device (905) verifies that the new identity information is properly signed. In one embodiment of the present invention, the new identity is to be signed using the private key $K_{pri}^1$ (915) of the current identity of the device. Since the server has access to the records of the identities assigned to different products, the server can look up from the server database (909) the private key $K_{pri}^1$ (915) of the device based on the public $K_{pub}^1$ (913). The private key $K_{pri}^1$ (915) is not sent from the device. The new identity can be encrypted using the public key $K_{pub}^1$ (913) of the current identity of the device or a dynamically generated session key of the secure authenticated channel. The server can sign the new identity using the private key $K_{pri}^1$ (915) of the current identity of the device. When the device receives (903) the encrypted and signed new identity, the device (905) can verify the authenticity using the public key $K_{pub}^1$ (913) of the current identity of the device and decrypt it using the private key $K_{pri}^1$ (915) of the current identity of the device. Thus, the server stamps the new identities according to the secrets in the old identities for the authentication of the new identities. Since the old identities of the devices in the field have unique private keys, the new identities are signed differently for different devices in the field. Since the digital signature signed using the private key $K_{pri}^1$ (915) cannot be forged without the knowledge of the private key $K_{pri}^1$ (915), an attacker cannot intercept the new identity and substitute it with another identity. Since a digital signature signed using the private key $K_{pri}^1$ (915) is required, only the server with the prior knowledge about the private key $K_{pri}^1$ (915) is allowed to change the identity of the device (905). Other secrets in the current identity $S^1$ (911) can also be used to stamp the new identity $S^2$ (931) to prove that the received new identity $S^2$ (931) is authentic and is from a legitimate source. Alternatively, the new identity sent from the server (907) to the device (905) may be signed using the private key of the identity $S^2$ (921) of the server (907) for authenticity.

The process may also be used for repair purpose. For example, if the device losses its old unique identifier information, the device may be first reloaded with an initial set of identifier information and the identity loader. Then, after the system passes an integrity test, a new set of unique identifier information can be securely loaded into the product. In one embodiment of the present invention, the product always stores an initial set of identifier information. When the product is reset, the initial set of identifier information is loaded so that the product can be securely serialized through the use of the initial set of identifier information.

Although the above examples illustrate the serialization of hosts (e.g., digital television sets, set-top boxes, etc.) for digital cable systems, it is understood that the methods of the present invention can also be applied to the configuring of other types of products, such as satellite television systems or others. The methods can be used for configuring products that have a media playback security mechanism or a copy protection mechanism. For example, portable media players may have a media copy protection mechanism based on digital certificates for individually identifying the portable media players. The portable media players may receive content through wireless connections, such as cellular telecommunications links (e.g., in accordance with GSM (Global System for Mobile communications) or CDMA (Code Division Multiple Access), etc), wireless local area network (e.g., in accordance with IEEE (Institute of Electrical and Electronics Engineers) 802.11), or wireless personal area network (e.g., in accordance with IEEE 802.15 or Bluetooth). The portable media players may or may not have ports for wired connections. Unique identifier information may be used for securely deliver the content over the insecure wired or wireless connection. The unique identifier information for the portable media players can also be configured using an initial set of identifier information.

Further, for example, multimedia cell phones (or other handheld devices, such as a handheld computer) can have certificates for media playback or for copy protection. Multimedia cell phones may receive media information through cellular telecommunications links, or WiFi (wireless local area network) or Bluetooth. Media playback certificates or copy protection certificates can be used to control the distribution of valuable contents so that only legitimate devices can have access to the contents. According to embodiments of the present invention, a serialization/configuration process can make use of the content protection mechanism for loading corresponding unique certificates into these devices.

Similarly, multimedia computers (e.g., notebook computers, desktop computers, handheld computers, etc.) can also receive content information through various data paths, such as Internet, Ethernet, USB (Universal Serial Bus), PCI (Peripheral Component Interconnect), PCMCIA (Personal Computer Memory Card International Association) card, WiFi, or Bluetooth, etc. A playback certificate or a copy protection certificate may be implemented on a network device, on a graphics card, or using software through the execution by the microprocessor. The assignment of a unique certificate can also be performed through the use of an initial set of certificates and the built-in security mechanisms.

Similarly, the methods according to embodiments of the present invention can also be used with other multimedia devices, such as digital cinema projectors. The projectors may have playback certificates or copy protection certificates for the protection of content distribution. A projector may receive media streams from wired network connections, such as Internet, Ethernet, or wireless connections, such as cellular links or WiFi.

Further, the certificates may be used to authorize the use of software programs on a computer. For example, installed software programs can be serialized before they can be used. A security mechanism to authenticate the serialized software can be used to serialize the installed software. Further, when the configuration of the computer is changed, the certificate may be updated in a way secured through the use of the previous certificate.

The methods of the present invention can also be used with other types of devices, such as radio receivers, navigation systems, access control and security systems of cars or homes or other property. Such systems or devices can implement unique identifier information to selectively enable services to legitimate users. The authentication process involves transmitting unique identifier information over an automotive optical link, or WiFi, or Bluetooth, or a wired connection. For example, car radios can use playback certificates to identify themselves as legitimate devices. Car navigation systems allow access to content information, such as maps. A car key may digitally identify itself as a proper key using a certification. These devices and systems can also be serialized using the built-in security mechanism with an initial set of identifier information.

Figure 1:
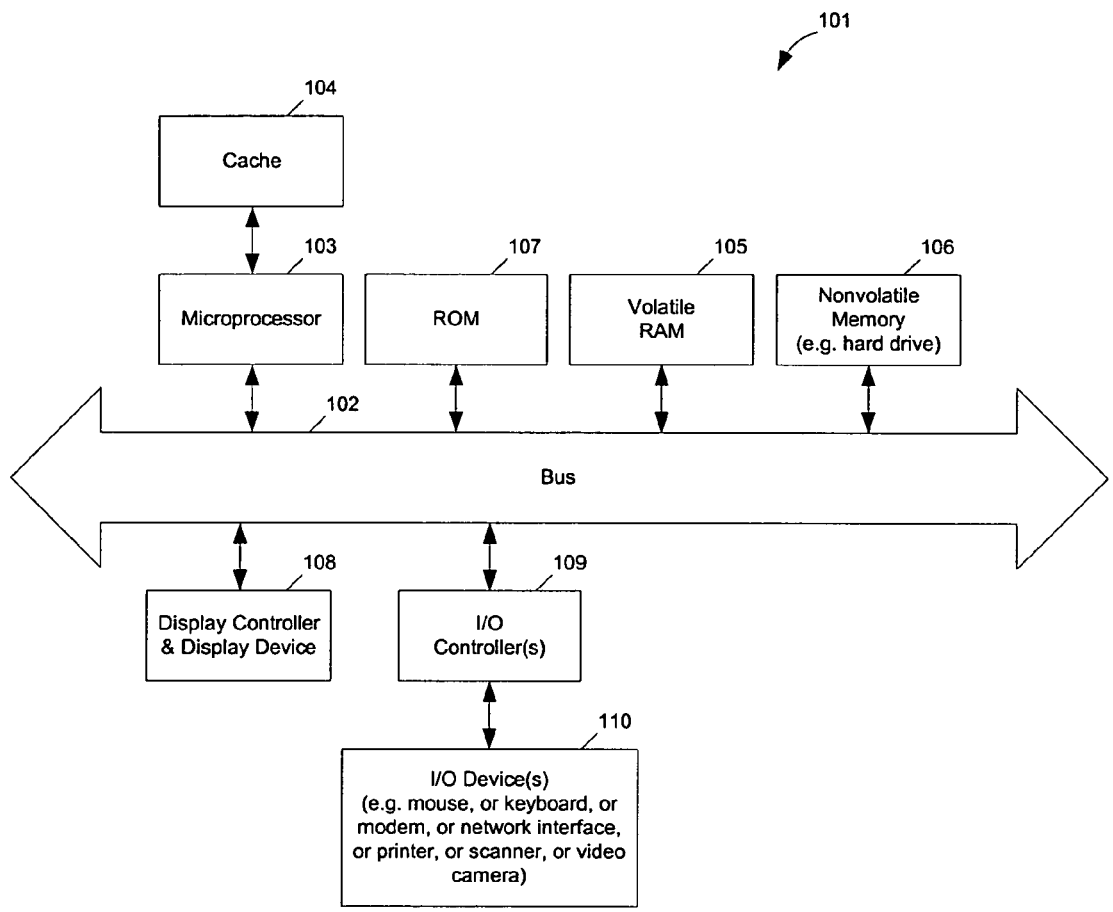
FIG. 1 shows a block diagram example of a data processing system which may be used with the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer or more components may also be used with the present invention. The computer system of FIG. 1 may, for example, be a Sun workstation, or a personal computer (PC) running a Windows operating system, or an Apple Macintosh computer.

As shown in FIG. 1, the computer system 101, which is a form of a data processing system, includes a bus 102 and system core logic 112 which interconnect a microprocessor 103, a ROM 107, and volatile RAM 105 and a non-volatile memory 106. The microprocessor 103, which may be, for example, a G3 or G4 or G5 microprocessor from Motorola, Inc. or IBM is coupled to cache memory 104 as shown in the example of FIG. 1. The bus 102 and system core logic 112 interconnect these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface. The bus 102 may include one or more buses connected to one another through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

In one embodiment of the present invention, devices are configured to have different executable codes so that even if one executable code on one serialized device is hacked, the hacked executable cannot be used on other serialized devices.

For example, in one embodiment, the secret information of the identity of a digital television receiver is maintained in the receiver memory (e.g., 501 of FIG. 12) in an encrypted form to prevent unauthorized access. A security software program may include an executable code (e.g., a sequence of executable computer program instructions) that decrypts the secret information of the identity. Traditionally, the same executable code is used in all of the products to decrypt the secret identity information of the receivers. When the executable code is compromised (e.g., reverse compiled, reverse engineered, hacked, etc.), the hacked code may be used to gain unauthorized access to the secret identity information.

In one embodiment of the present invention, at least some devices store the secret information in different formats (e.g., encrypted using encryption keys generated using different algorithms, encrypted using different algorithms, etc.). Thus, a corresponding compatible security software program is to be used to read the secret information in a particular format. When one executable program is hacked, the hacked executable program will not work on a large population of devices of the same kind, since the hacked executable program is not compatible with the formats used on these devices. In one embodiment, a large number of formats are generated automatically according to compilation keys so that the percentage of devices that store secret information in the same format is small. Optionally, each device can have a different format.

Figure 19:
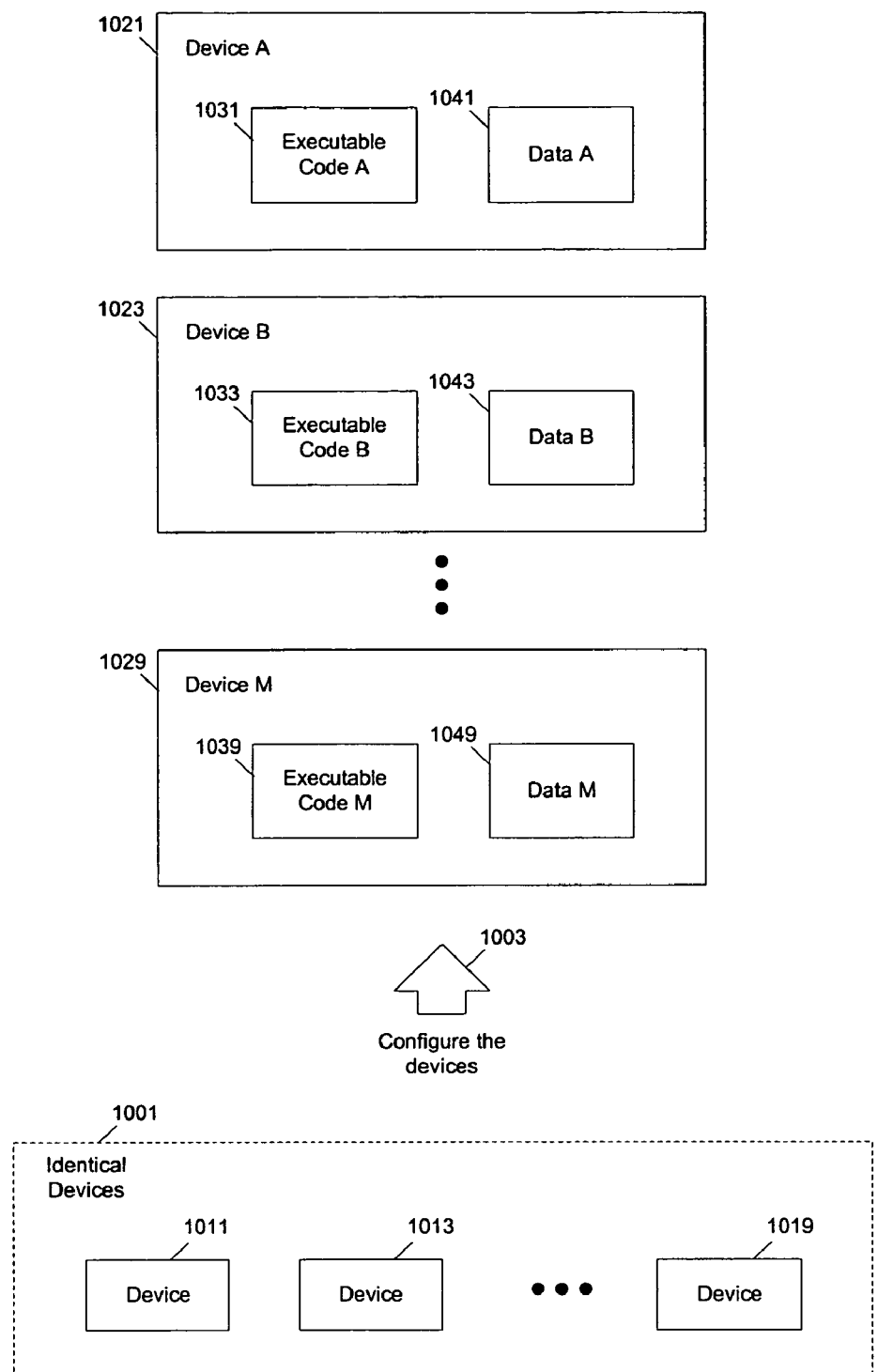
FIG. 19 illustrates a way to configure identical devices into individualized products according to one embodiment of the present invention.

FIG. 19 illustrates a way to configure identical devices into individualized products according to one embodiment of the present invention. In FIG. 19, a set of identical devices (1001) (such as devices 1011, 1013, . . . , 1019) are configured (1003) into individualized products, such as devices 1021, 1023, . . . , 1029. These identical devices may be serially presented to a serialization device on a manufacturing assembly line. In one embodiment, the individualized products provide the same functionality to the end-users, such that when authorized to use an end-user observes no difference in functionalities provided by the individualized products. The individualized products have data (1041, 1043, . . . , 1049) in different formats and executable codes (1031, 1033, . . . , 1039) that are compatible only with the corresponding formats of the data (1041, 1043, . . . , 1049). Thus, if one executable code is hacked, the hacked executable code cannot be used to read the data on or otherwise interoperate with a large population (or a large percentage) of the individualized products.

In one embodiment, the data (e.g., 1041, 1043, . . . , or 1049) includes the secret information of unique identity of the device stored in an encrypted form. The executable code (e.g., 1031, 1033, . . . , or 1039) is used to read the secret information.

In one embodiment, each device has a unique executable code. Alternatively, a finite number of different executable codes are distributed randomly in the device population. For example, a random portion of the device population (e.g., one or more of the devices) has an executable code that is compatible with one data format but not compatible with other data formats so that even if another executable code is hacked, the hacked code cannot be used to work with the data on this portion of the device population.

In one embodiment, the differences in the executable codes include different instructions to perform different algorithmic operations. Thus, although the executable codes perform the same overall functionality (e.g., to receive the same types of input data, or the same input data, and to generate the same types of output data), the operations are different such that the same input data generates different results (of the same type). For example, the algorithmic operations may be used to compute a key for a decryption operation. When the same input data is provided, different algorithmic operations generate different key values for the decryption operation. Thus, only one of the algorithmic operations is compatible with a given encrypted data.

In one embodiment, the differences in the algorithmic operations are spread within at least a portion of executable code so that there is no centralized location for the differences. This increases the resistance to hacking activities. For example, the differences in the algorithmic operations are implemented as different instruction sequences, instead of a generic algorithm directed by different inputs read from a centralized location. Thus, the differences among the algorithmic operations appear to be random unless the entire set of the executable codes, or a large portion of the entire set of the executable codes, is studied. This arrangement increases the resistance to hacking from the entire device population point of view.

Figure 20:
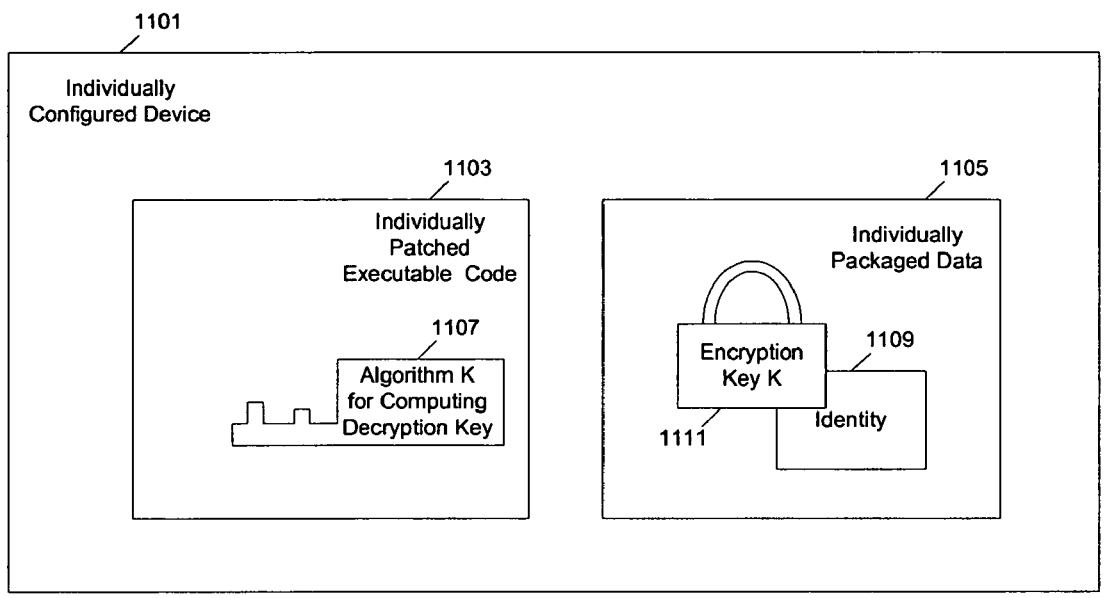
FIGS. 20-21 illustrate individualized devices according to embodiments of the present invention.
Figure 21:
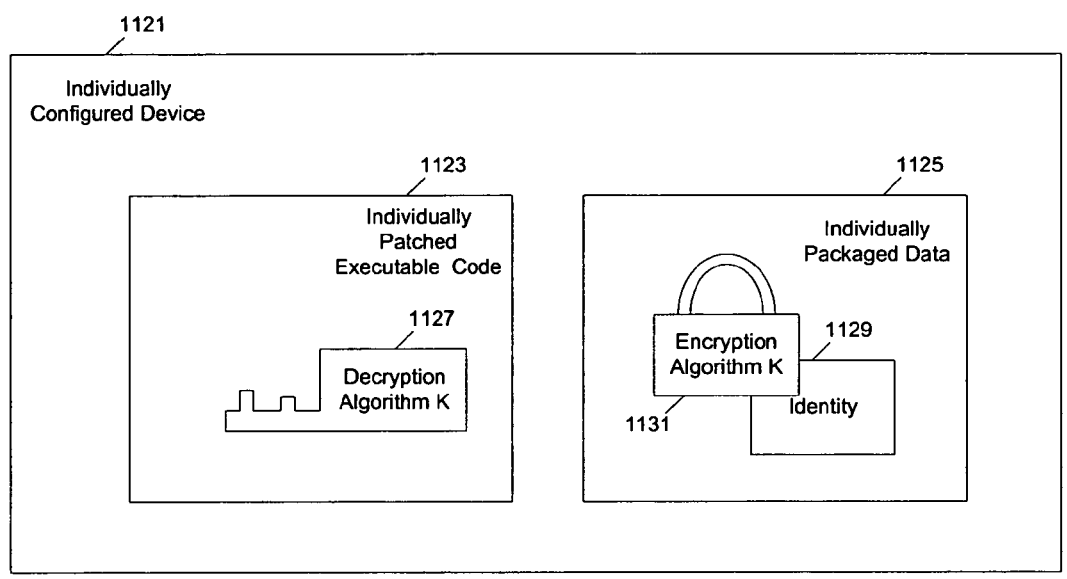

FIGS. 20-21 illustrate individualized devices according to embodiments of the present invention. In FIG. 20, an individually configured device (1101) includes individually packaged data (1105) and individually patched executable code (1103). The executable code (1103) is stored to manipulate (e.g., decrypt and read) the stored data (1105). The data (1105) is packaged in a way that is different from at least some of the other devices of the same kind (e.g., from the point of view of legitimate users) so that an executable code patched correspondingly is to be used in order to successfully manipulate the stored data (1105).

In one embodiment, the data (1105) includes the identity (1109) of the device. Each device is to be configured to have a unique identity (e.g., in a way as described above and illustrated in FIGS. 3-18). The identity (1109) (or at least a portion of the identity) is encrypted using an encryption key (1111) to prevent unauthorized access to the secret information of the identity (1109). The executable code (1103) contains a set of instructions to implement an algorithm (1107) for computing a decryption key that can be used to access (e.g., decrypt) the identity (1109).

In one embodiment, the encryption key for protecting the identity (1109) is individualized so that an algorithm to compute the corresponding decryption key is different from those used in many other devices of the same kind. Thus, if the executable code (1103) is hacked to gain unauthorized access to the identity (1109) of device (1101), the algorithm is not usable to gain unauthorized access to identity information of many other devices of the same kind.

In FIG. 21, an individually configured device (1121) includes individually packaged data (1125) and individually patched executable code (1123). The identity (1129) of the device is protected using an encryption algorithm (1131) that is different from those used in many other devices of the same kind. The individually patched executable code (1123) includes a set of instructions to implement a compatible decryption algorithm (1127). Thus, a hacked executable code based on a different device may not be able to gain unauthorized access to the identity (1129) of the device (1121).

In one embodiment, different data formats may include a combination of different encryption algorithms and different encryption keys.

In one embodiment of the present invention, different executable codes are automatically derived from one executable code (or the source code) according to different compilation parameters. For example, a large number of different executable codes can be generated from patching the source code according to different compilation parameters, generating differently patched source codes and compiling the patched source codes into different binary executable codes. Alternatively, patching can be made directly to a binary executable code to generate different binary executable codes.

Figure 22:
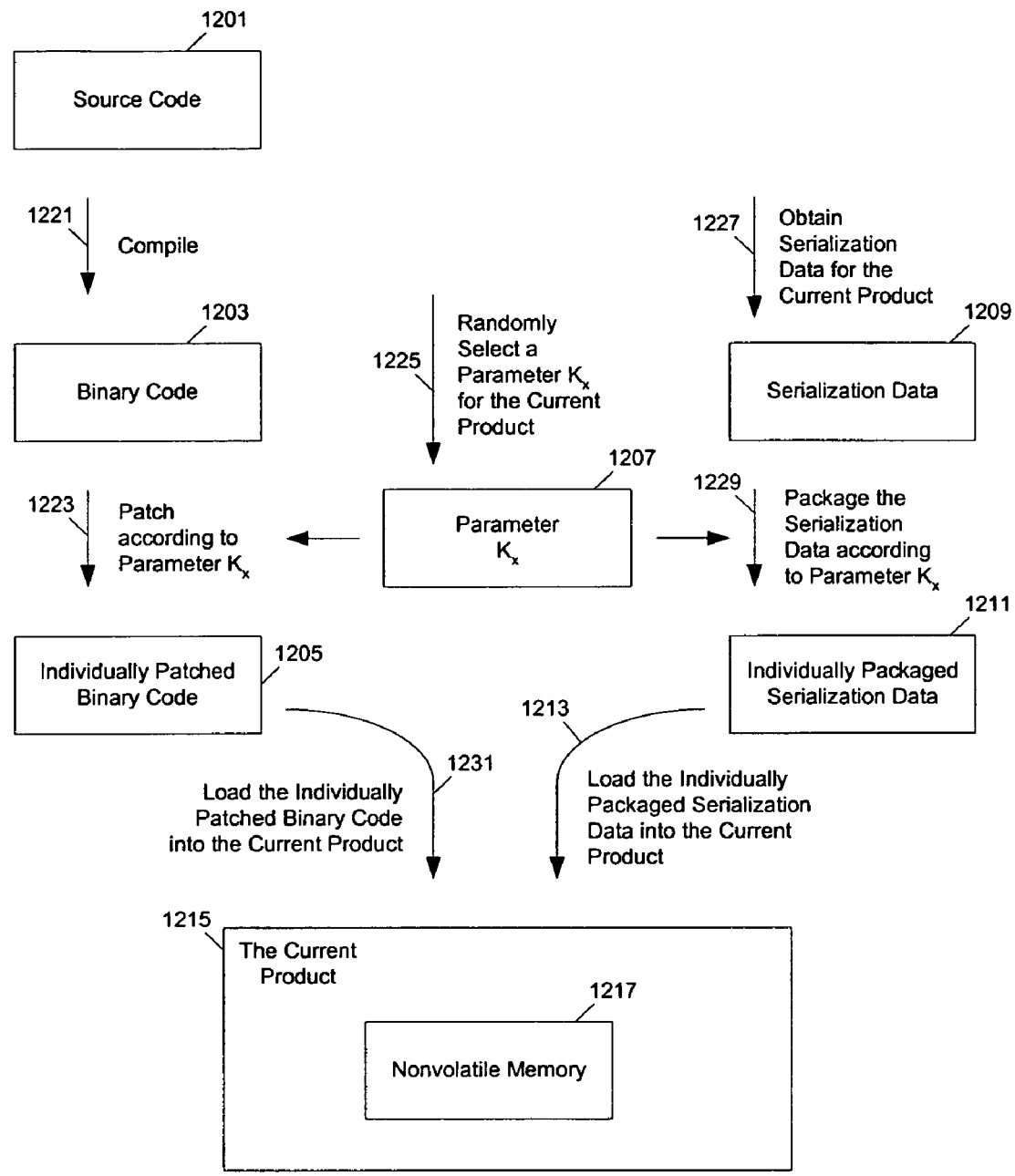
FIGS. 22-23 illustrate flow charts of product configuration processes according to embodiments of the present invention.
Figure 23:
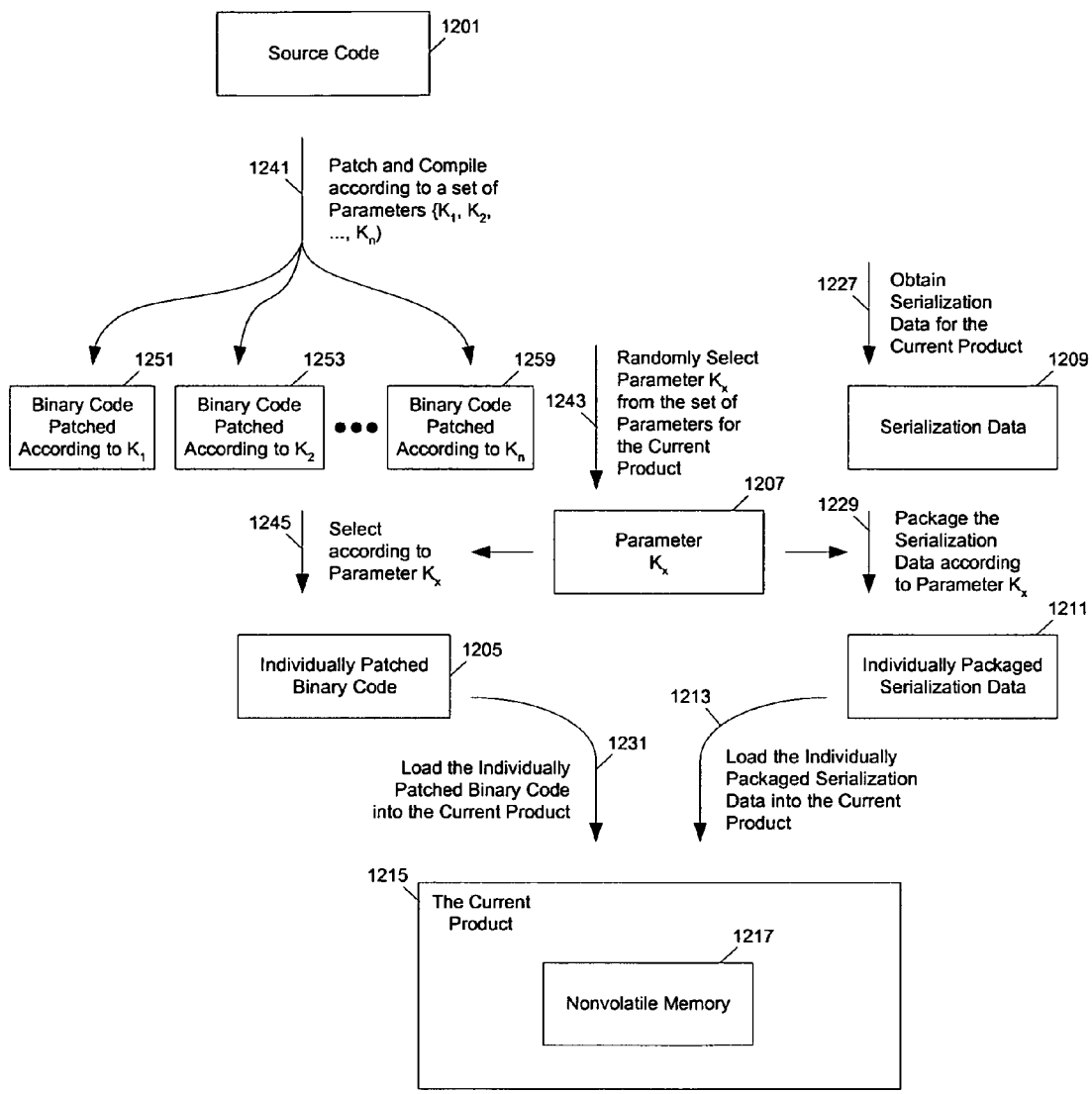

FIGS. 22-23 illustrate flow charts of product configuration processes according to embodiments of the present invention.

In FIG. 22, a source code (1201) is compiled (1221) to generate a binary code (1203). The compilation of the source code can be performed in a secure environment to prevent unauthorized access to the source code (1201). The binary code (1203) is delivered to the manufacture facility for installation into the products.

In one embodiment, a parameter $K_x$ (1207) is randomly selected (1225) for the current product (e.g., in the manufacture facility). The binary code (1203) is patched (1223) according to the parameter $K_x$ (1207) to generate the individually patched binary code (1205). After the serialization data (1209) is obtained (1227) (e.g., from a server, a database, a file, etc.) for the current product, the serialization data is packaged (1229) according to the parameter $K_x$ (1207) such that executable codes patched according to other parameters cannot decrypt/decode the individually packaged serialization data (1211).

In one embodiment, the differently patched binary codes have a substantially same size (e.g., since the changes made according to the patching is small in code size). For example, the variation in the code size is less than one percent of the average code size. Alternatively, the differently patched binary codes can be patched to have the same code size (e.g., through padding dummy instructions, sequences of instructions for obfuscation, etc.). In one embodiment, a large number of differently patched binary codes have only a small number of different code sizes (or a common code size).

To configure the current product, the individually patched binary code is loaded (1231) into the current product; and the individually packaged serialization data is also loaded (1213) into the nonvolatile memory (1217) of the current product (1215).

In one embodiment, the serialization data include the secret identity information; and the patched binary code (1205) and packaged serialization data (1211) are loaded into the current product through a secure authenticated channel established using an initial set of identity information of the current product.

In one embodiment, the initial set of identity information may be different among the products to be serialized. For example, the products in one manufacture facility (or all manufacture facilities), or in one batch, can share the same initial set of identity information; and products in different manufacture facility, or different batches in the same manufacture facility may use different initial sets of identity information. Alternatively, the same initial set of identity information can be used for all the products.

In one embodiment, the selection of the parameter $K_x$ is performed in the server (e.g., 301 illustrated in FIG. 3), which obtains (1227) the serialization data (e.g., from a database or a file) and packages (1229) the serialization data according to the parameter $K_x$ (1207). In one embodiment, the binary code (1203) is also maintained in the server (e.g., 301 illustrated in FIG. 3), which patches (1223) the binary code according to the parameter $K_x$.

In the embodiment illustrated in FIG. 23, the source code (1201) is patched and compiled (1241) according to a set of parameters $\{K_1, K_2, \ldots, K_n\}$ to generate binary codes (1251, 1253, . . . , 1259) respectively. Alternatively, patching can be performed directly on the compiled binary of the source code (1201) to obtain the set of binary codes (12151, 1253, . . . , 1259). In one embodiment, after the compilation, the binary codes are further patched (e.g., using dummy instructions and instructions for the purpose of obfuscation) to reach a same target code size (or to reduce the code size differences among different binary codes).

In one embodiment, the set of binary codes (1251, 1253, . . . , 1259) are stored on the server (e.g., 301), which selects one according to the parameter $K_x$ (1207) that is randomly selected (1243) for the current product from the set of parameters $\{K_1, K_2, \ldots, K_n\}$. The compatible pair of patched binary code (1205) and packaged serialization data (1211) are loaded (1231, 1213) into the nonvolatile memory (1217) of the current product (1215) to serialize the product.

In one embodiment, the patching and/or the compiling operations are performed in a secure environment; and only the binary codes (1251, 1253, . . . , 1259) are delivered to the manufacture facility. Alternatively, the compilation and patching operations can also be performed in a server (e.g., 301) on a manufacture facility.

Figure 24:
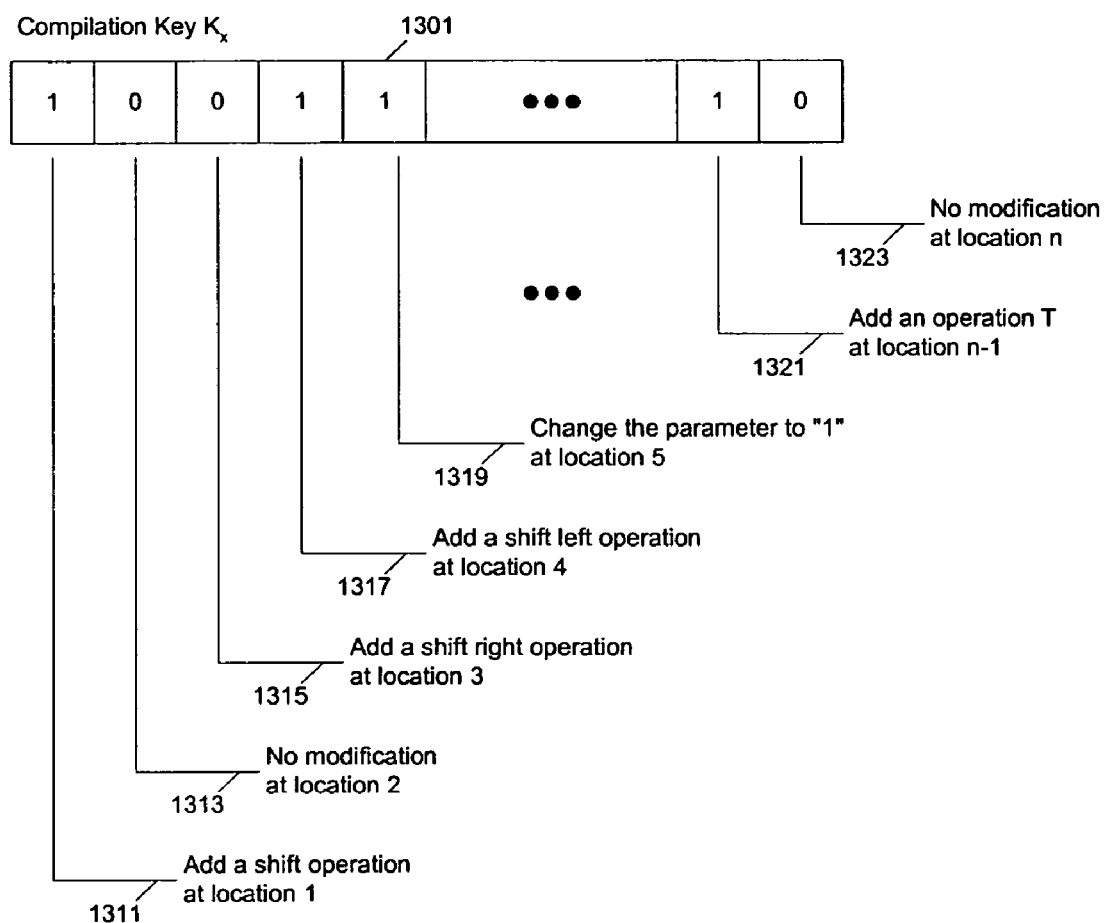
FIG. 24 illustrates a compilation key which can be used to generate an executable code according to embodiments of the present invention.

FIG. 24 illustrates a compilation key which can be used to generate an executable code according to embodiments of the present invention. In one embodiment of the present invention, a compilation key includes a number of bits (e.g., 1301). A bit of the compilation key can be used to indicate an optional variation at one location in the executable code. For example, a bit having a value of one (1) can be used to indicate (1311) that a shift operation is to be added at a location in the master executable code; another bit having a value of zero (0) can be used to indicate (1313) no modification at another location in the master executable code; a further bit having a value of zero (0) can be used to indicate (1315) that a shift right operation is to be added at a further location; a further bit having a value of (1) can be used to indicate (1317) that a shift left operation is to be added at a further location; a further bit having a value of one (1) can be used to indicate (1319) that a parameter is to be changed to one (1) at a further location. The value of a bit can be used to indicate (e.g., 1321) whether or not to add an operation T (e.g., shift, add, subtract, invert, and, or, etc.) at a particular location in the executable code). The value of a bit can also be used to indicate (e.g., 1323) whether or not a predefined modification is to be made at a particular location in the executable code.

In one embodiment, the executable code has a number of separate locations, distributed in at least a portion of the executable code, that have optional/configurable operations, such as shift, add, subtract, invert, and, or, etc. The addition/modification of one or more of these operations in these locations can change the result produced by the portion of the executable code. However, it is preferred that variations in the operations do not change significantly the overall computation performance level of the devices so that the devices appear to be the same to the legitimate users.

In one embodiment, the configured/modified/patched portion of the executable code generated according to the compilation options is related to cryptographic operations, such as decryption operations or computation of a decryption key. The options according to the compilation key do not change the functionality of the code. For example, the features/purpose of the executable code and/or the cryptographic strength, etc., are substantially the same so that when the user is authorized to use the executable code, the user obtains the same service from the executable code. However, the options change the detailed cryptographic process so that the executable codes are cryptographically different.

FIG. 24 illustrates an example in which each compilation option is specified using a bit in the compilation key. However, it is understood that a compilation option can be specified using more than one bit (e.g., when an option has more than two choices). Thus, in general, a compilation key can be a set of compilation option values.

Figure 25:
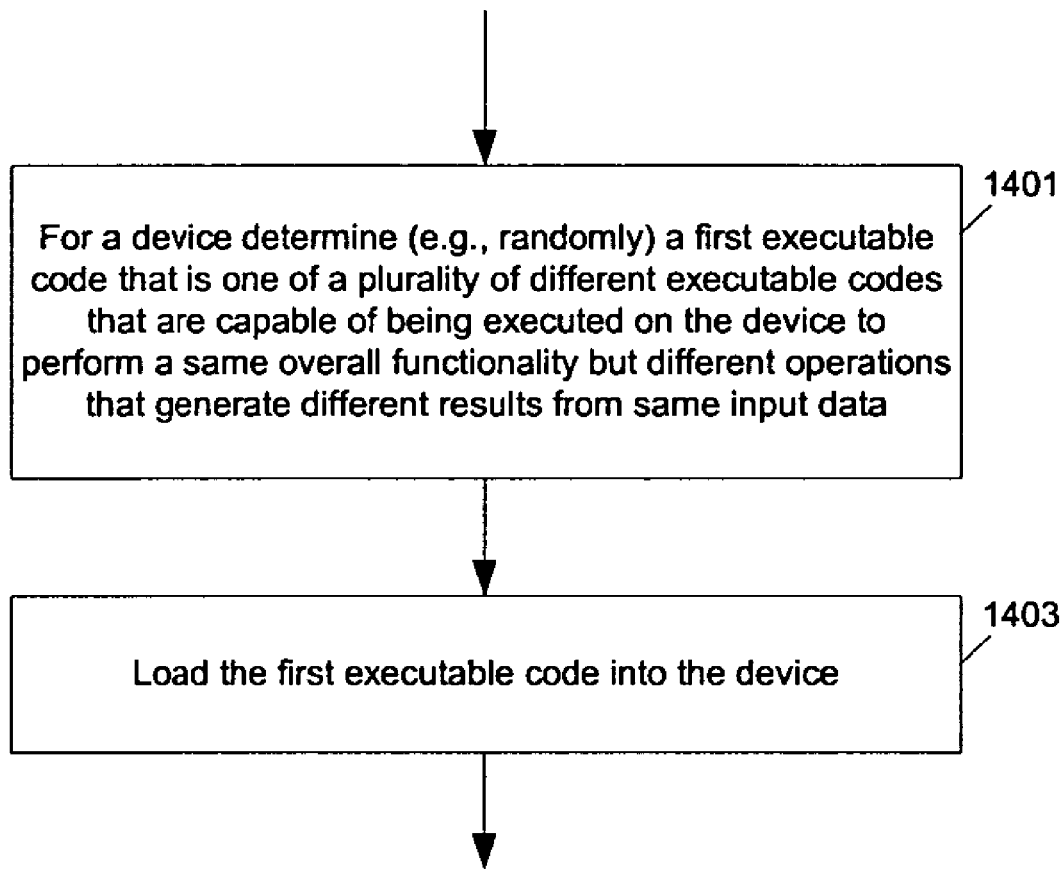
FIGS. 25-26 show methods to configure product according to embodiments of the present invention.
Figure 26:
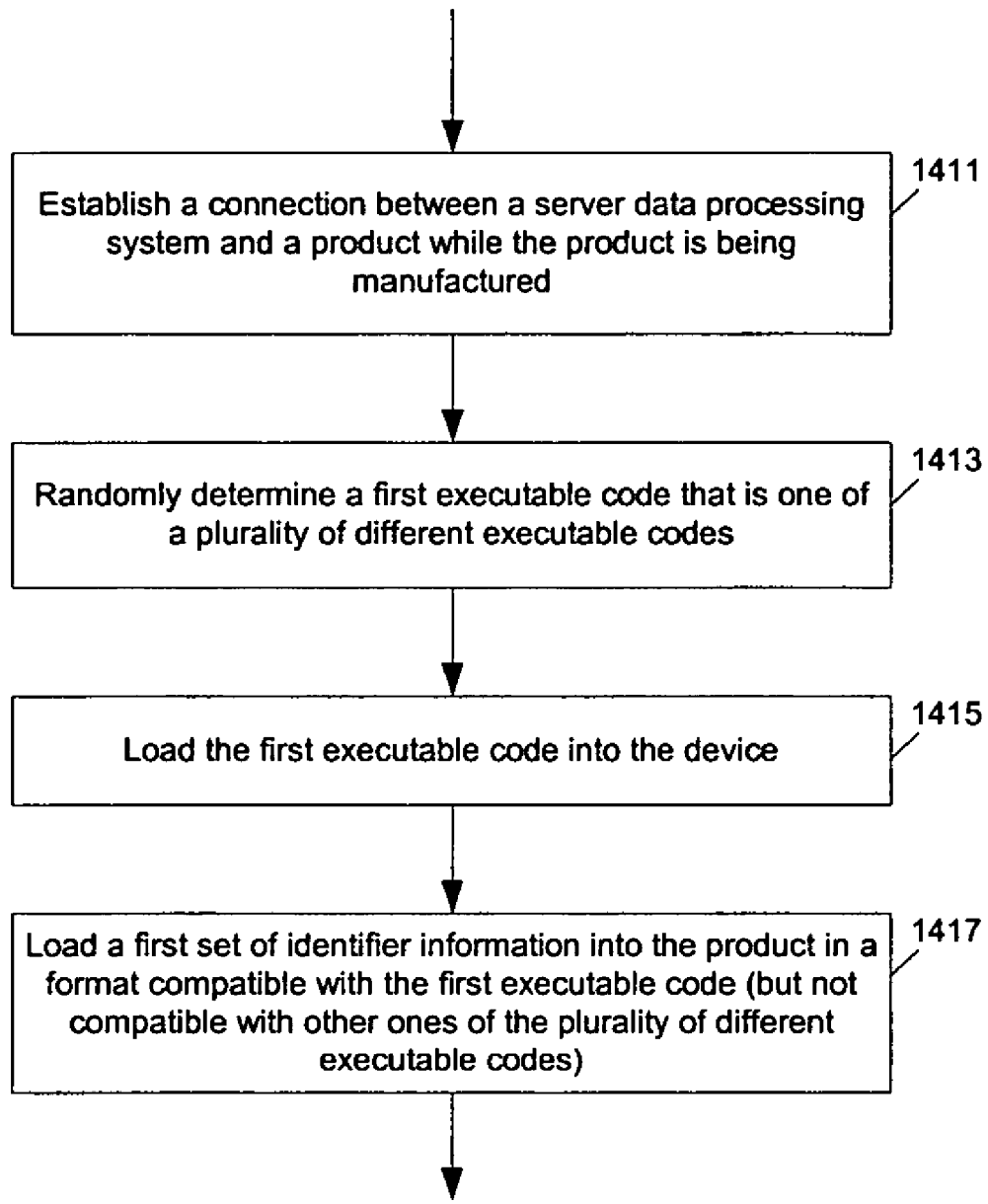

FIGS. 25-26 show methods to configure product according to embodiments of the present invention.

In the method of FIG. 25, operation 1401 determines (e.g., randomly), for a device, a first executable code that is one of a plurality of different executable codes that are capable of being executed on the device to perform a same overall functionality but different operations that generate different results from same input data. Operation 1403 loads the first executable code into the device. Thus, similar devices are loaded (e.g., randomly) with different executable codes that provide the same functionality to the legitimate users and prevent one hacked executable code from being used on all other devices of the same kind.

In FIG. 26, operation 1411 establishes a connection between a server data processing system and a product while the product is being manufactured (e.g., on the assembly line for configuring, testing, etc.). Operation 1413 randomly determines a first executable code that is one of a plurality of different executable codes. The first executable code may be randomly selected from the plurality of different executable codes, or modified from a master executable code according to a randomly selected compilation key (e.g., a randomly selected set of compilation options).

Operation 1415 loads the first executable code into the device. Operation 1417 loads a first set of identifier information into the product in a format compatible with the first executable code (but not compatible with other ones of the plurality of different executable codes).

In one embodiment, the first execution code and the first set of identifier information are loaded into the product through a secure authenticated channel based on an initial set of identifiers. For example, in one embodiment, the first execution code and the first set of identifier information are transmitted from the server to the product using the secure authenticated connection that has communication scrambling against unauthorized access and that is established based on verifying the initial set of identifier information. Such a transmission can be performed in a way similar to operation 811 to transmit the new set of identifier information in the example of the serialization process of FIG. 17.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of manufacturing a product, the method comprising:
   establishing a connection between a data processing system and the product while the product is being manufactured;
   selecting a first executable code for the product, the first executable code being one of a plurality of different executable codes including at least a second executable code, the first executable code comprising first executable instructions to encrypt and decrypt a first product identifier information, the second executable code comprising second executable instructions to encrypt and decrypt a second product identifier information;
   encrypting a first set of identifier information according to the first executable code;
   encrypting a second set of identifier information according to the second executable code;
   loading, while the product is being manufactured, the first set of encrypted identifier information in a format compatible with the first executable code into the product;
   loading, while the product is being manufactured, the first executable code into the product, wherein the first set of encrypted identifier information is decryptable by the first executable code, but not decryptable by the second executable code, wherein the first executable code is capable of decrypting, modifying and re-encrypting the first set of identifier information in a manner that is not compatible with the second executable code;
   loading, while another product is being manufactured, the second set of encrypted identifier information in a format compatible with the second executable code into the another product; and
   loading, while the another product is being manufactured, the second executable code into the another product, wherein the second set of encrypted identifier information is decryptable by the second executable code, but not decryptable by the first executable code, wherein the second executable code is capable of decrypting, modifying and re-encrypting the second set of identifier information in a manner that is not compatible with the first executable code.

2. The method of claim 1, wherein the first set of identifier information is capable of being used to control distribution of media which is received by the product; wherein the first set of identifier information is unique relative to other products which are otherwise the same as the product; and wherein the first set of identifier information is used to decrypt or descramble media received by the product when in use.

3. The method of claim 1, wherein the determining the first executable code for the product comprises:
   randomly selecting a first compilation key from a plurality of different compilation keys; and
   modifying a reference execution code according to the first compilation key to generate the first executable code.

4. The method of claim 1, wherein the determining the first executable code for the product comprises:
   randomly selecting a first compilation key from a plurality of different compilation keys; and
   selecting the first executable code from the plurality of executable codes according to the first compilation key;
   wherein the plurality of executable codes are generated according to the plurality of compilation keys respectively.

5. The method of claim 1, wherein the plurality of executable codes have a same overall functionality but different operations which generate different results from same input data.

6. The method of claim 1, wherein the plurality of different executable codes have different instructions to perform different algorithmic operations.

7. The method of claim 1, wherein the plurality of different executable codes have differences in multiple locations in instruction sequences.

8. The method of claim 1, wherein each of the plurality of executable codes computes a key for decrypting identifier information stored on a product using a different algorithm which generates a different result from same input data; and the first set of identifier information in the format is decryptable with a key computed using the first executable code but not decryptable using a key computed using one of the plurality of executable codes that is different from the first executable code.

9. The method of claim 2, further comprising:
   verifying that an initial set of identifier information stored within the product is valid to establish a secure authenticated channel;
   wherein the loading the first set of identifier information is in response to validly verifying the initial set of identifier information; and
   wherein the loading the first set of identifier information is secured through the verifying of the initial set of identifier information.

10. The method of claim 3, wherein the modifying includes modifying multiple separate locations in the second execution code according to the first compilation key.

11. A method to configure a device, the method comprising:
    selecting a first executable code for the device, the first executable code being one of a plurality of different executable codes including at least a second executable code that are capable of being executed on the device, the plurality of executable codes having a same overall functionality but different operations which generate different results from same input data, the first executable code comprising first executable instructions to encrypt and decrypt a first product identifier information, the second executable code comprising second executable instructions to encrypt and decrypt a second product identifier information;
    encrypting a first set of identifier information according to the first executable code;
    encrypting a second set of identifier information according to the second executable code;
    loading, while the device is being manufactured, the first executable code into the device, wherein the first set of encrypted identifier information is decryptable by the first executable code, but not decryptable by the second executable code, wherein the first executable code is capable of decrypting, modifying, and re-encrypting the first set of identifier information in a manner that is not compatible with the second executable code; loading, while another product is being manufactured, the second set of encrypted identifier information in a format compatible with the second executable code into the another product; and loading, while the another product is being manufactured, the second executable code into the another product, wherein the second set of encrypted identifier information is decryptable by the second executable code, but not decryptable by the first executable code, wherein the second executable code is capable of decrypting, modifying and re-encrypting the second set of identifier information in a manner that is not compatible with the first executable code.

12. The method of claim 11, wherein the first executable code is a random one from the plurality of different executable codes.

13. The method of claim 11, further comprising:
verifying that an initial set of identifier information stored within the device is valid to establish a secure authenticated channel; and
loading a new set of identifier information in a first format compatible with the first executable code into the device over the secure authenticated channel;
wherein the first executable code is loaded into the device over the secure authenticated channel.

14. The method of claim 11, further comprising:
loading data in a first format into the device, the first format being one of a plurality of different formats, the first executable code being compatible with the first format, any of the plurality of different executable codes other than the first executable being not compatible with the first format.

15. The method of claim 12, further comprising:
randomly selecting a first set of information from a plurality of sets of information;
wherein the first executable code is generated based on the first set of information; and
wherein the plurality of different executable codes are generated based on the plurality of sets of information respectively.

16. The method of claim 13, wherein any one of the plurality of different executable codes other than the first executable code is not compatible with the first format; and the first format is an encrypted format.

17. A machine readable storage medium storing executable computer program instructions which when executed by a data processing system cause said system to perform a method for manufacturing a product, the method comprising:
establishing a connection between the data processing system and the product while the product is being manufactured;
selecting a first executable code for the product, the first executable code being one of a plurality of different executable codes including at least a second executable code, the first executable code comprising first executable instructions to encrypt and decrypt a first product identifier information, the second executable code comprising second executable instructions to encrypt and decrypt a second product identifier information;
encrypting a first set of identifier information according to the first executable code;
encrypting a second set of identifier information according to the second executable code;

loading, while the product is being manufactured, the first set of identifier information in a format compatible with the first executable code into the product; and loading, while the product is being manufactured, the first executable code into the product, wherein the first set of encrypted identifier information is decryptable by the first executable code, but not decryptable by the second executable code, wherein the first executable code is capable of decrypting, modifying, and re-encrypting the first set of identifier information in a manner that is not compatible with the second executable code loading, while another product is being manufactured, the second set of encrypted identifier information in a format compatible with the second executable code into the another product; and loading, while the another product is being manufactured, the second executable code into the another product, wherein the second set of encrypted identifier information is decryptable by the second executable code, but not decryptable by the first executable code, wherein the second executable code is capable of decrypting, modifying and re-encrypting the second set of identifier information in a manner that is not compatible with the first executable code.

18. The medium of claim 17, wherein the first set of identifier information is capable of being used to control distribution of media which is received by the product; wherein the first set of identifier information is unique relative to other products which are otherwise the same as the product; and wherein the first set of identifier information is used to decrypt or descramble media received by the product when in use.

19. The medium of claim 17, wherein the determining the first executable code for the product comprises:
randomly selecting a first compilation key from a plurality of different compilation keys;
wherein the plurality of executable codes are generated according to the plurality of compilation keys respectively; and
wherein the plurality of executable codes have a same overall functionality but different operations which generate different results from same input data.

20. The medium of claim 19, wherein the determining the first executable code for the product further comprises:
modifying multiple separate locations in a second execution code according to the first compilation key to generate the first executable code.

21. The medium of claim 19, wherein the determining the first executable code for the product further comprises:
selecting the first executable code from the plurality of executable codes according to the first compilation key.

22. A machine readable storage medium storing executable computer program instructions which when executed by a data processing system cause said system to perform a method to configure a device, the method comprising:
selecting a first executable code for the device, the first executable code being one of a plurality of different executable codes including at least a second executable code that are capable of being executed on the device, the plurality of executable codes having a same overall functionality but different operations which generate different results from same input data, the first executable code comprising first executable instructions to encrypt and decrypt a first product identifier information, the second executable code comprising second executable instructions to encrypt and decrypt a second product identifier information;

encrypting a first set of identifier information according to the first executable code;
encrypting a second set of identifier information according to the second executable code; and
loading, while the device is being manufactured, the first executable code into the device, wherein the first set of encrypted identifier information is decryptable by the first executable code, but not decryptable by the second executable code, wherein the first executable code is capable of decrypting, modifying, and re-encrypting the first set of identifier information in a manner that is not compatible with the second executable code.

23. The medium of claim 22, wherein the first executable code is a random one from the plurality of different executable codes; and wherein the method further comprises:
   randomly selecting a first set of information from a plurality of sets of information;
   wherein the first executable code is generated based on the first set of information;
   wherein the plurality of different executable codes are generated based on the plurality of sets of information respectively; and the plurality of different executable codes occupy a substantially same size of storage space.

24. The medium of claim 22, wherein the method further comprises:
   verifying that an initial set of identifier information stored within the device is valid to establish a secure authenticated channel; and
   loading a new set of identifier information in a first format compatible with the first executable code into the device over the secure authenticated channel;
   wherein the first executable code is loaded into the device over the secure authenticated channel; and
   wherein any one of the plurality of different executable codes other than the first executable code is not compatible with the first format.

25. A system for manufacturing a product, the system comprising:
   means for establishing a connection between a data processing system and the product while the product is being manufactured, wherein the means for establishing includes a processor;
   means for selecting a first executable code for the product, the first executable code being one of a plurality of different executable codes including at least a second executable code, the first executable code comprising first executable instructions to encrypt and decrypt a first product identifier information, the second executable code comprising second executable instructions to encrypt and decrypt a second product identifier information;
   means for encrypting a first set of identifier information according to the first executable code;
   encrypting a second set of identifier information according to the second executable code;
   means for loading, while the product is being manufactured, the first set of encrypted identifier information in a format compatible with the first executable code into the product; and
   means for loading, while the product is being manufactured, the first executable code into the product over the connection, wherein the first set of encrypted identifier information is decryptable by the first executable code, but not decryptable by the second executable code, wherein the first executable code is capable of decrypting, modifying and re-encrypting the first set of identifier information in a manner that is not compatible with the second executable code
   means for loading, while another product is being manufactured, the second set of encrypted identifier information in a format compatible with the second executable code into the another product; and
   means for loading, while the another product is being manufactured, the second executable code into the another product, wherein the second set of encrypted identifier information is decryptable by the second executable code, but not decryptable by the first executable code, wherein the second executable code is capable of decrypting, modifying and re-encrypting the second set of identifier information in a manner that is not compatible with the first executable code.

26. The system of claim 25, further comprising:
   means for verifying that an initial set of identifier information stored within the product is valid to establish a secure authenticated channel over the connection;
   wherein loading the first set of identifier information into the product is in response to validly verifying the initial set of identifier information;
   wherein loading the first set of identifier information into the product is secured through the verifying of the initial set of identifier information; and
   wherein the plurality of executable codes have a same overall functionality but different operations which generate different results from same input data.

27. The system of claim 25, wherein the means for determining the first executable code for the product comprises:
   means for randomly selecting a first compilation key from a plurality of different compilation keys; and
   means for patching at multiple separate locations in a second execution code according to the first compilation key to generate the first executable code.

28. The system of claim 25, wherein the means for determining the first executable code for the product comprises:
   means for randomly selecting a first compilation key from a plurality of different compilation keys; and
   means for selecting the first executable code from the plurality of executable codes according to the first compilation key;
   wherein the plurality of executable codes are generated according to the plurality of compilation keys respectively.

29. A data processing system to configure a device, the data processing system comprising:
   means for selecting a first executable code for the device, the first executable code being one of a plurality of different executable codes including at least a second executable code that are capable of being executed on the device, the plurality of executable codes having a same overall functionality but different operations which generate different results from same input data, the first executable code comprising first executable instructions to encrypt and decrypt a first product identifier information, the second executable code comprising second executable instructions to encrypt and decrypt a second product identifier information wherein the means for determining includes a processor;
   means for encrypting a first set of identifier information according to the first executable code;
   encrypting a second set of identifier information according to the second executable code;
   means for loading, while the device is being manufactured, the first executable code into the device, wherein the first set of encrypted identifier information is decryptable by the first executable code, but not decryptable by the second executable code, wherein the first executable code is capable of decrypting, modifying, and re-encrypting the first set of identifier information in a manner that is not compatible with the second executable code means for loading, while another product is being manufactured, the second set of encrypted identifier information in a format compatible with the second executable code into the another product; and means for loading, while the another product is being manufactured, the second executable code into the another product, wherein the second set of encrypted identifier information is decryptable by the second executable code, but not decryptable by the first executable code, wherein the second executable code is capable of decrypting, modifying and re-encrypting the second set of identifier information in a manner that is not compatible with the first executable code.

30. The data processing system of claim 29, further comprising:

means for randomly selecting a first set of information from a plurality of sets of information;

wherein the first executable code is generated based on the first set of information; and wherein the plurality of different executable codes are generated based on the plurality of sets of information respectively.

31. The data processing system of claim 29, further comprising:

means for verifying that an initial set of identifier information stored within the device is valid to establish a secure authenticated channel; and means for loading a new set of identifier information in a first format compatible with the first executable code into the device over the secure authenticated channel;

wherein the first executable code is loaded into the device over the secure authenticated channel.

32. The data processing system of claim 29, further comprising:

means for loading data in a first format into the device, the first format being one of a plurality of different formats, the first executable code being compatible with the first format, any of the plurality of different executable codes other than the first executable being not compatible with the first format;

wherein the plurality of different executable codes have substantially same code sizes; and wherein the plurality of different executable codes are cryptographically different.

* * * * *